(12) United States Patent
Lee et al.

(10) Patent No.: US 12,350,635 B2
(45) Date of Patent: Jul. 8, 2025

(54) COSMETIC MANUFACTURING APPARATUS, CONTROL METHOD OF THE SAME, AND COSMETIC MANUFACTURING SYSTEM

(71) Applicant: AMOREPACIFIC CORPORATION, Seoul (KR)

(72) Inventors: Jaehyung Lee, Yongin-si (KR); Jongwoo Kim, Yongin-si (KR); Dongyoung Kim, Yongin-si (KR); Kyungjun Ma, Yongin-si (KR); Jongchul Park, Yongin-si (KR); Hyunseung Lee, Yongin-si (KR); Jinu Im, Yongin-si (KR); Byeng Su Joung, Yongin-si (KR)

(73) Assignee: AMOREPACIFIC CORPORATION, Seoul (KR)

( * ) Notice: Subject to any disclaimer, the term of this patent is extended or adjusted under 35 U.S.C. 154(b) by 963 days.

(21) Appl. No.: 17/477,887

(22) Filed: Sep. 17, 2021

(65) Prior Publication Data

US 2022/0091596 A1 Mar. 24, 2022

(30) Foreign Application Priority Data

Sep. 22, 2020 (KR) .......................... 10-2020-0122025
Sep. 22, 2020 (KR) .......................... 10-2020-0122038
(Continued)

(51) Int. Cl.
*B01F 35/22* (2022.01)
*A45D 44/00* (2006.01)
(Continued)

(52) U.S. Cl.
CPC ........ *B01F 35/2205* (2022.01); *A45D 44/005* (2013.01); *B01F 23/69* (2022.01);
(Continued)

(58) Field of Classification Search
CPC .. B01F 35/2205; B01F 23/69; B01F 33/8442; B01F 35/7176; B01F 2101/21;
(Continued)

(56) References Cited

U.S. PATENT DOCUMENTS 9,007,588 B1 * 4/2015 Igarashi ................. G05B 15/02
356/402
10,843,150 B1 * 11/2020 Ong .......................... G02F 1/01
(Continued)

FOREIGN PATENT DOCUMENTS

KR 10-1490987 B1 2/2015
KR 10-2019-0050832 A 5/2019
(Continued)

*Primary Examiner* — Michael Collins
(74) *Attorney, Agent, or Firm* — Sughrue Mion, PLLC

(57) ABSTRACT

This disclosure relates to a cosmetic manufacturing apparatus, a control method thereof, and a cosmetic manufacturing system. According to an embodiment of the disclosure, there is provided a cosmetic manufacturing apparatus including: a control unit for calculating a first composition ratio based on the user's skin condition measured by a measurement sensor, receiving cosmetic purchase history of the user from an operating server, and calculating a second composition ratio by modifying the first composition ratio with a preset algorithm based on the purchase history; and a cosmetic material supply unit which discharges cosmetic materials according to one of the first composition ratio or the second composition ratio, so that a cosmetic is manufactured according to the one of the first composition ratio or the second composition ratio.

8 Claims, 16 Drawing Sheets

(30) Foreign Application Priority Data

| | | |
|---|---|---|
| Sep. 22, 2020 | (KR) | 10-2020-0122387 |
| Sep. 22, 2020 | (KR) | 10-2020-0122396 |
| Sep. 22, 2020 | (KR) | 10-2020-0122410 |
| Sep. 22, 2020 | (KR) | 10-2020-0122429 |
| Sep. 22, 2020 | (KR) | 10-2020-0122457 |
| Sep. 22, 2020 | (KR) | 10-2020-0122594 |

(51) Int. Cl.
<br>*B01F 23/60* (2022.01)
<br>*B01F 33/84* (2022.01)
<br>*B01F 35/71* (2022.01)
<br>*B01F 101/21* (2022.01)
<br>*G05B 19/418* (2006.01)
<br>*G06Q 10/087* (2023.01)

(52) U.S. Cl.
<br>CPC ...... *B01F 33/8442* (2022.01); *B01F 35/7176* (2022.01); *G05B 19/41865* (2013.01); *G05B 19/4189* (2013.01); *A45D 2044/007* (2013.01); *B01F 2101/21* (2022.01); *G05B 2219/32035* (2013.01); *G06Q 10/087* (2013.01)

(58) Field of Classification Search
<br>CPC ........ B01F 29/30; B01F 33/85; B01F 35/881; A45D 44/005; A45D 2044/007; G05B 19/41865; G05B 19/4189; G05B 2219/32035; G06Q 10/087; Y02P 90/02
<br>See application file for complete search history.

(56) References Cited

U.S. PATENT DOCUMENTS

| | | | |
|---|---|---|---|
| 11,832,711 B2* | 12/2023 | Pack | G07F 17/18 |
| 2015/0021356 A1* | 1/2015 | Witchell | B01F 33/848 |
| | | | 222/23 |
| 2016/0107133 A1* | 4/2016 | Sugino | G01N 21/25 |
| | | | 366/142 |
| 2018/0368558 A1* | 12/2018 | Park | A45D 44/005 |
| 2019/0295728 A1 | 9/2019 | Jeong et al. | |
| 2020/0038824 A1* | 2/2020 | Charraud | B01F 35/2209 |
| 2020/0047140 A1* | 2/2020 | Layton | G06V 10/56 |
| 2023/0052182 A1* | 2/2023 | Jang | B01F 33/844 |
| 2023/0127741 A1* | 4/2023 | Kips | G01F 11/029 |
| | | | 132/286 |
| 2023/0282366 A1 | 9/2023 | Jeong et al. | |

FOREIGN PATENT DOCUMENTS

| | | |
|---|---|---|
| KR | 10-2019-0055430 A | 5/2019 |
| KR | 10-2157050 B1 | 9/2020 |

* cited by examiner

FIG. 15

| L1 | a1 | b1 | Ratios (A : B : C : D) |
|---|---|---|---|
| 90 | 40 | 40 | 1: 1: 0.9: 0.7 |
| 89 | 39 | 39 | 1: 0.95: 0.85: 0.75 |
| 88 | 38 | 38 | 1: 0.90: 0.8: 0.7 |
| 87 | 37 | 37 | 1: 0.85: 0.78: 0.72 |
| ⋮ | ⋮ | ⋮ | ⋮ |

COSMETIC MANUFACTURING APPARATUS, CONTROL METHOD OF THE SAME, AND COSMETIC MANUFACTURING SYSTEM

CROSS-REFERENCE TO RELATED APPLICATION(S)

This application is based on and claims priority of Korean Patent Applications No 10-2020-0122025, No 10-2020-0122396, No 10-2020-0122387, No 10-2020-0122594, No 10-2020-0122038, No 10-2020-0122457, No 10-2020-0122410, and No 10-2020-0122429, all filed on Sep. 22, 2020 with the Korean Intellectual Property Office, the entire contents of which are hereby incorporated by reference.

TECHNICAL FIELD

This disclosure relates to a cosmetic manufacturing apparatus, a control method thereof, and a cosmetic manufacturing system.

BACKGROUND

Cosmetics are used for beauty and skin health, and consumers' desire to use cosmetics suitable for them is getting stronger. In order to satisfy these needs, various types of user cosmetic manufacturing apparatuses have been proposed.

In general, a cosmetic manufacturing apparatus operates by measuring or diagnosing a user's skin condition, calculating a mixing ratio of cosmetic materials suitable for the user based on this, and then mixing the cosmetic materials according to the mixing ratio to manufacture a cosmetic. As technology develops in recent years, such a cosmetic manufacturing apparatus has been proposed as an automated apparatus in which a series of processes can be sequentially performed.

However, the cosmetic manufacturing apparatus according to the prior art has the following problems.

The conventional cosmetic manufacturing apparatus has a problem that it takes a very long time to manufacture the cosmetic desired by the user. Additionally, the cosmetic manufacturing apparatus may be provided so that the process of manufacturing cosmetics can be continuously carried out from measuring or diagnosing the skin condition of the user. From the user's point of view, waiting for the completion of cosmetics in front of the cosmetic manufacturing apparatus is just a tedious process. Therefore, although one or two uses based on curiosity can be expected, there is a possibility that the continuous use rate of the cosmetic manufacturing apparatus will be lowered.

Further, additional and inconvenient operations, such as, coupling the lid of the cosmetic container or a discharging member by an operator who operates the cosmetic manufacturing apparatus, in order for cosmetics that can be provided through the cosmetic manufacturing apparatus to be delivered to an actual user, withdrawing the cosmetic container from the cosmetic manufacturing apparatus, and handing it to the user, must be performed.

Further, the conventional cosmetic manufacturing apparatus simply recommended a composition ratio under the consideration of the skin condition, and a cosmetic manufacturing apparatus for recommending a composition ratio by considering an individual user's preference for cosmetics (e.g., preference for a bright color, and the like) and skin condition at the same time has not been proposed.

SUMMARY

A cosmetic manufacturing apparatus, a control method thereof and a cosmetic manufacturing system according to an embodiment of this disclosure are proposed to solve the above-described problems, and this disclosure is to provide a cosmetic manufacturing apparatus, a control method thereof, and a cosmetic manufacturing system capable of increasing the productivity of a cosmetic manufacturer or sales store by automating the cosmetic manufacturing process.

One aspect of the present disclosure is to provide a cosmetic manufacturing apparatus, a control method thereof, and a cosmetic manufacturing system, which are capable of manufacturing cosmetics by reflecting the user's preference for cosmetics, According to an aspect of this disclosure, there may be provided a cosmetic manufacturing apparatus comprising: a control unit (900) for calculating a first composition ratio based on the user's skin condition measured by a measurement sensor, receiving cosmetic purchase history of the user from an operating server (40), and calculating a second composition ratio by modifying the first composition ratio with a preset algorithm based on the purchase history; and a cosmetic material supply unit (200) which discharges cosmetic materials according to one of the first composition ratio or the second composition ratio, so that a cosmetic is manufactured according to the one of the first composition ratio or the second composition ratio.

Additionally, there may be provided a cosmetic manufacturing apparatus, further comprising a user interface unit (130) which displays at least one of the first composition ratio and the second composition ratio, and receives as an input one of the first composition ratio, the second composition ratio, and a third composition ratio which is one of the first composition ratio and the second composition ratio that modification has been applied to, and wherein the cosmetic material supply unit 200 discharges cosmetic materials according to the received one of the input first composition ratio to the third composition ratio, so that a cosmetic is manufactured according to the received one composition ratio as an input.

Additionally, there may be provided a cosmetic manufacturing apparatus, wherein by the control unit (900), the first composition ratio may be determined by inputting the skin measurement values measured by the measurement sensor as a variable into a preset calculation formula, or a composition ratio corresponding to the preset values in the product database which have the smallest difference between themselves and the skin measurement values measured by the measurement sensor may be determined as the first composition ratio.

Additionally, there may be provided a cosmetic manufacturing apparatus, wherein the product database stores L1, a1, and b1 values, and composition ratios corresponding to these values, wherein the skin measurement values are measured as arbitrary values L2, a2, b2 by the measurement sensor, and wherein a composition ratio corresponding to the values stored in the product database having the smallest value of $\sqrt{(L1-L2)^2+(a1-a2)^2+(b1-b2)^2}$ may be set as the first composition ratio.

Additionally, there may be provided a cosmetic manufacturing apparatus, wherein the skin measurement values measured by the measurement sensor are represented by L2, a2, and b2, and when the cosmetic purchase history which are represented as L3, a3, and b3 is received from the operating server 40, by the control unit (900), the skin measurement values are modified to measurement modification values, (P*L3+L2)/(P+1), (P*a3+a2)/(P+1), and (P*b3+b2)/(P+1), the second composition ratio may be determined to be a composition ratio corresponding to the preset values preset in the product database having the smallest difference between themselves and the measurement modification values.

Additionally, there may be provided a cosmetic manufacturing apparatus, wherein the first composition ratio is represented by a composition ratio X1:Y1:Z1:K1 for arbitrary cosmetic materials, when receiving a purchase history of a cosmetic having composition ratio X2:Y2:Z2:K2 for arbitrary cosmetic materials from the operating server (40), by the control unit (900), the second composition ratio is set to (P*X1+X2)/(P+1):(P*Y1+Y2)/(P+1):(P*Z1+Z2)/(P+1):(P*K1+K2)/(P+1).

Additionally, there may be provided a cosmetic manufacturing apparatus, wherein P is a natural number between 1 and 10 that is input by a user from the user interface unit (130) or the terminal (20).

Additionally, there may be provided a cosmetic manufacturing apparatus, wherein the user interface unit (130) is provided with an input unit for selecting whether a cosmetic to be manufactured is of a sample manufacturing mode in which the cosmetic to be manufactured is provided as a sample, or of a finished product manufacturing mode in which the cosmetic to be manufactured is provided as a finished product.

Additionally, there may be provided a cosmetic manufacturing apparatus, wherein the user interface unit (130) is provided with an Input unit for selecting whether a cosmetic to be manufactured is a foundation product or a skin care product.

According to another embodiment of the disclosure, there may be provided a cosmetic manufacturing system comprising: a measurement sensor for measuring user's skin condition; an operating server (40) which stores cosmetic purchase history of a user, calculating a first composition ratio based on the skin condition of the user measured by the measurement sensor, and calculating a second composition ratio by modifying the first composition ratio with a preset algorithm based on the purchase history; a terminal (20) for receiving as an input one of the second composition ratio or a third composition ratio which is one of the first composition ratio and the second composition ratio that modification has been applied to; a cosmetic manufacturing apparatus (10) of items 1 to 9 which discharges cosmetic materials according to the received one of the first to third composition ratios, so that a cosmetic is manufactured according to the received one composition ratio.

Additionally, there may be provided a cosmetic manufacturing system, wherein by the operating server (40), the first composition ratio may be determined by inputting the skin measurement values measured by the measurement sensor as a variable into a preset calculation formula, or a composition ratio corresponding to the preset values in the product database which have the smallest difference between themselves and the skin measurement values measured by the measurement sensor may be determined as the first composition ratio.

According to another embodiment of the disclosure, there may be provided a cosmetic manufacturing system comprising: an operating server (40) which stores one of a first composition ratio calculated based on the user's skin condition measured by the measurement sensor and a second composition ratio obtained by modifying the first composition ratio with a preset algorithm; a terminal (20) for receiving and displaying at least one of the first composition ratio and the second composition ratio from the operating server (40); and a cosmetic manufacturing apparatus (10) of items 1 to 11 which receives as an input one of the first composition ratio, the second composition ratio, and a third composition ratio which is one of the first composition ratio and the second composition ratio that modification has been applied to, from the terminal (20), and manufactures a cosmetic according to the received composition ratio.

According to still another embodiment of the disclosure, there may be provided a control method of a cosmetic manufacturing apparatus, the control method comprising: receiving skin condition measured by a measurement sensor; calculating a first composition ratio based on the received skin condition by a control unit (900); receiving the cosmetic purchase history of the user from an operating server 40, and calculating a second composition ratio by modifying the first composition ratio with a preset algorithm based on the purchase history; discharging cosmetic materials according to the second composition ratio by controlling a cosmetic material supply unit (200) by the control unit (900).

Additionally, there may be provided a control method of the cosmetic manufacturing apparatus, the control method further comprising: after the discharging the cosmetic materials according to the second composition ratio by controlling the cosmetic material supply unit (200) by the control unit (900), manufacturing a cosmetic according to the second composition ratio by controlling a conveying means (800) by the control unit (900); when the manufactured cosmetic is manufactured in a sample manufacturing mode, receiving a fourth composition ratio obtained by modifying the composition ratio of the manufactured cosmetic; and manufacturing a cosmetic according to the fourth composition ratio by controlling the conveying unit (800) by the control unit (900).

According to still another embodiment of the present disclosure, there may be provided a control method of a cosmetic manufacturing apparatus, the control method comprising: receiving skin condition measured by a measurement sensor; calculating a first composition ratio based on the received skin condition; receiving the cosmetic purchase history of the user from an operating server 40, and calculating a second composition ratio by modifying the first composition ratio with a preset algorithm based on the purchase history; displaying at least one of the first composition ratio and the second composition ratio on a user interface unit (130); receiving one of the first composition ratio, the second composition ratio, and a third composition ratio which is one of the first composition ratio and the second composition ratio that modification has been applied to, and transmitting the received one to a control unit (900); discharging cosmetic materials according to the received one of the first composition ratio to the third composition ratio by controlling a cosmetic material supply unit (200) by the control unit (900).

Additionally, there may be provided a control method of the cosmetic manufacturing apparatus, wherein the receiving one of the first composition ratio, the second composition ratio, and a third composition ratio which is one of the first composition ratio and the second composition ratio that modification has been applied to, and transmitting the received one to a control unit (900) includes: displaying a selection reason on a user interface unit (130) so that a user inputs a reason for selecting one of the first composition ratio and the second composition ratio; receiving as an input the selection reason, calculating a third composition ratio according to a preset algorithm, and displaying the calculated third composition ratio on the user interface unit (130), by the control unit (900); and receiving as an input one of the first composition ratio, the second composition ratio, and the third composition ratio displayed on the user interface unit (130), and transmitting the received one of the first composition ratio, the second composition ratio, and the third composition ratio to the control unit (900).

Additionally, there may be provided a control method of the cosmetic manufacturing apparatus, the control method further comprising: after the discharging the cosmetic materials according to the received one of the first composition ratio to the third composition ratio by controlling a cosmetic material supply unit (200) by the control unit (900), manufacturing a cosmetic according to the received composition ratio by controlling a conveying means (800) by the control unit (900); when the manufactured cosmetic is manufactured in a sample manufacturing mode, receiving a fourth composition ratio obtained by modifying the composition ratio of the manufactured cosmetic; and manufacturing a cosmetic according to the fourth composition ratio by controlling the conveying unit (800) by the control unit (900).

The cosmetic manufacturing apparatus, the control method thereof, and a cosmetic manufacturing system according to an embodiment of this disclosure can manufacture cosmetics suitable for a user's skin condition.

Additionally, they can manufacture cosmetics to which the user's preference for cosmetics has been reflected.

BRIEF DESCRIPTION OF DRAWINGS

FIG. 15 shows an example of composition ratios of cosmetic material components corresponding to L, a, and b set values stored in the product database.

DETAILED DESCRIPTION

Hereinafter, specific exemplary embodiments of this disclosure will be described in detail with reference to the drawings. Additionally, it is noted that in the description of the disclosure, the detailed description for known related configurations or functions may be omitted when it is deemed that such description may obscure essential points of the disclosure.

In the following description, the term "cosmetic" may be understood as a product that acts directly or indirectly on the user's skin to give a cosmetic effect to the skin, protect the skin, improve or change the skin condition, or have one or more of these functions, and "cosmetic material" may be understood as a substance constituting such cosmetic. Hereinafter, "composition ratio" may be understood as a weight ratio or volume ratio of cosmetic materials provided as a cosmetic.

The cosmetic manufacturing apparatus 10 and the cosmetic manufacturing system 1 of this embodiment can manufacture customized cosmetics.

Here, the customized cosmetic may be understood as a cosmetic manufactured according to the composition ratio of the cosmetic determined based on the user's skin condition or the result of analyzing or diagnosing the skin condition.

Alternatively, a customized cosmetic may be understood as a cosmetic manufactured according to a composition ratio determined based on a user's intention or a user context collected through various channels. Here, the user context may be understood as being data related to the user's life, such as the user's biometric information, spatial information around the user, the preset time range and preset spatial range related to the user's schedule, the user's shopping history, the user's purchase history, and the user's online activity record, and Data that can be transmitted from any device or a third party, which can be transmitted from any device or a third party.

Figure 1:
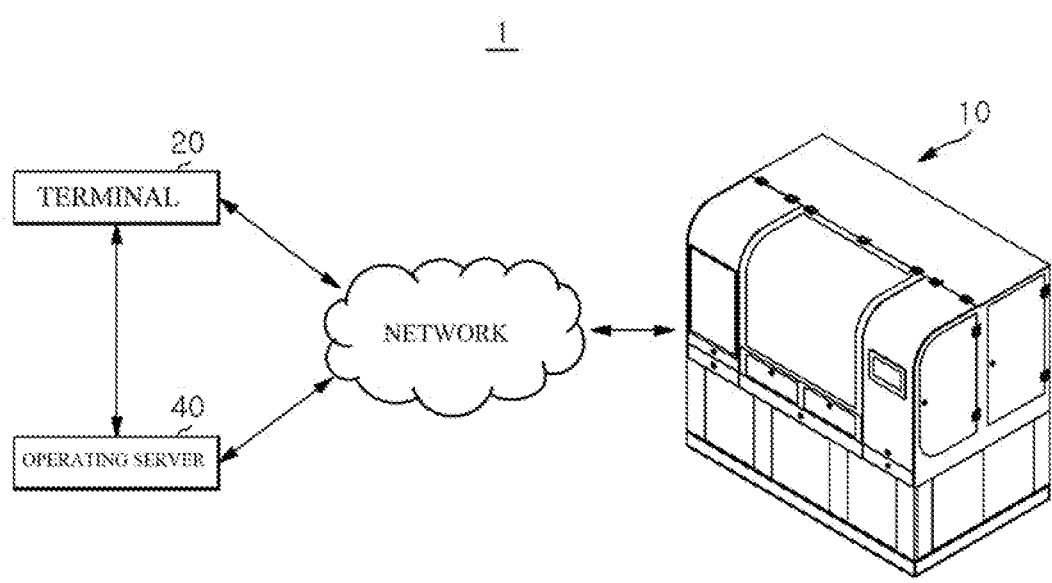
FIG. 1 is a diagram illustrating the configuration of the cosmetic manufacturing system according to an embodiment of the disclosure.

FIG. 1 is a diagram illustrating the configuration of the cosmetic manufacturing system 1 according to an embodiment of the disclosure.

Referring to FIG. 1, the cosmetic manufacturing system 1 according to an embodiment of this disclosure, which manufactures a cosmetic by collecting data and determining a composition ratio for manufacturing a customized cosmetic, may include a cosmetic manufacturing apparatus 10, a terminal 20, and an operating server 40. In this embodiment, the cosmetic manufacturing system 1 is a system for manufacturing a customized cosmetic, and the cosmetic manufacturing apparatus 10 will be described by way of example as an apparatus capable of manufacturing a customized cosmetic. However, the spirit of this disclosure is not limited thereto, and may be employed to produce cosmetics having one predetermined composition ratio.

Components constituting the cosmetic manufacturing system 1 may be connected through a network to exchange data with each other or to transmit data from one side to another side. Here, the network includes both a wired network and a wireless network, and the kind thereof is not limited as long as it can transmit data.

The cosmetic manufacturing apparatus 10 may mix a plurality of cosmetic materials based on the composition ratio data required for manufacturing a cosmetic, put them into a cosmetic container, and provide it to a user. Here, the cosmetic container may include a first container provided as a pump-type container and a second container provided as a compact container, which will be described later.

Each of these first and second containers may be understood as a container formed by coupling at least one of a mixing container 161 for accommodating a cosmetic material, and the component constituting the cosmetic container.

Figure 6:
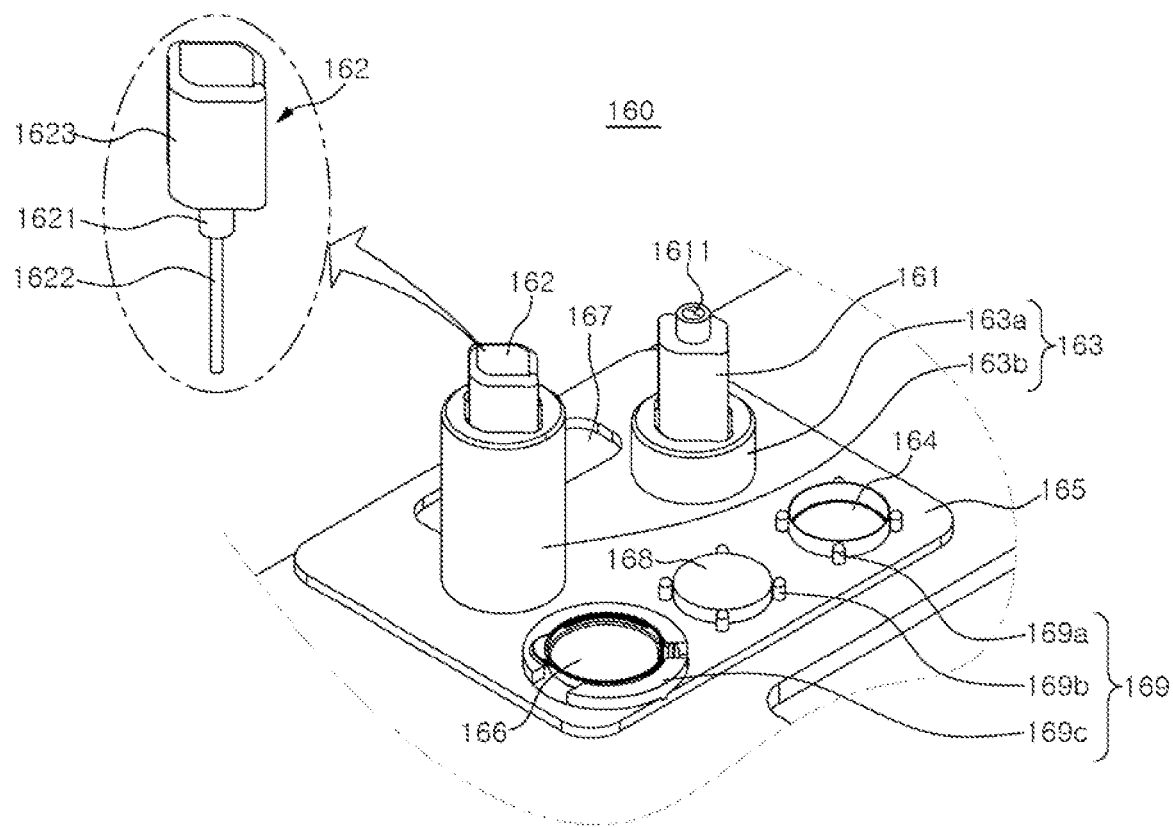
FIG. 6 is a perspective view showing a part supply unit disposed on one side of a main body of the cosmetic manufacturing apparatus of FIG. 1.

For example, when the first container is the pump-type container, the mixing container 161 and a discharging member 162 which is one of the components may be coupled to each other to provide the first container (see FIG. 6). However, the spirit of this disclosure is not limited to the case where the mixing container 161 is necessarily provided as a part of the first container, but the components may include a separate receiving container (not shown) which can be coupled with the discharging member 162 to provide the first container.

In addition, when the second container is a compact container, the second container may be provided by coupling a base container 164, an impregnating member 168, and the cover container 166, which are some of the components.

That is, in this embodiment, the components may include a part constituting the first container (e.g., the discharging member 162 when the mixing container 161 and the discharging member 162 are coupled, and the receiving container and the discharging member 162 when the separate receiving container and the discharging member 162 are coupled) and a part constituting the second container (e.g., the base container 164, the impregnating member 168, the cover container 166).

Additionally, the composition ratio data may be understood as electronic data including the types of a plurality of cosmetic materials and their component ratios. Such composition ratio data may be completely processed and provided to the cosmetic manufacturing apparatus 10, or may be created by the cosmetic manufacturing apparatus 10 by transmitting basic data to be processed (including user context) to the cosmetic manufacturing apparatus 10.

For example, the composition ratio data may be provided to the cosmetic manufacturing apparatus 10 from the terminal 20, such as a user's own mobile phone, tablet PC, or desktop computer. In this case, the composition ratio data may be provided to the cosmetic manufacturing apparatus 10 directly from the terminal 20, or through the operating server 40 managed by an operating host of the cosmetic manufacturing apparatus 10. According to an embodiment, the terminal 20 may provide basic data for generating composition ratio data, for example, data such as a photographed image of the user's skin.

The terminal 20 may receive information about the user context, and the input information may be transmitted to at least one of the operating server 40 and the cosmetic manufacturing apparatus 10.

Additionally, the terminal 20 may include a measurement sensor (not shown) for measuring the user's skin condition. For example, the measurement sensor may include at least one of a camera, a moisture sensor, and an oil content sensor.

When the measurement sensor is provided as a camera, the user's skin condition may be photographed through the camera provided to the terminal 20, and the user's skin condition may be determined based on the photographed image of the user's skin.

The composition ratio data may be provided to the cosmetic manufacturing apparatus 10 from the measurement sensor of the terminal 20 capable of measuring the user's skin condition.

The terminal 20 may transmit a result measured through the measurement sensor (e.g., a camera, a moisture sensor, an oil sensor, or the like) to the cosmetic manufacturing apparatus 10 as it is, or transmit analyzed or diagnosed skin condition data to the cosmetic manufacturing apparatus 10.

Although, in this embodiment, the measurement sensor is described by way of example as being a part of the terminal 20, the spirit of this disclosure is not limited thereto, and the measurement sensor may be provided through a device separate from the terminal 20.

The cosmetic manufacturing apparatus 10 may determine the composition ratio data based on the data received from the terminal 20. According to an embodiment, the terminal 20 may transmit the above-described skin condition data to the cosmetic manufacturing apparatus 10 through the operating server 40. In this case, the operating server 40 may generate the composition ratio data based on the data received from the terminal 20, and provide it to the cosmetic manufacturing apparatus 10.

Alternatively, the cosmetic manufacturing apparatus 10 may transmit the data received from the terminal 20 to the operating server 40, and may receive the composition ratio data generated by the operating server 40 and use it for manufacturing cosmetics.

The operating server 40 may receive the data required for the generation of the composition ratio data as described above, generate the composition ratio data, and provide it to the cosmetic manufacturing apparatus 10, or may transmit the received composition ratio data to the cosmetic manufacturing apparatus 10 as it is. At this time, the operating server 40 may generate the composition ratio data suitable for each user based on the separately collected user context as well as the data transmitted from the terminal 20, and may transmit the generated composition ratio data to the cosmetic manufacturing apparatus 10 according to the user's request or the request of the cosmetic manufacturing apparatus 10.

In this embodiment, the cosmetic manufacturing apparatus 10 may assemble a plurality of cosmetic containers having different shapes.

Although, in this embodiment, the cosmetic manufacturing apparatus 10 is described by way of example as assembling two kinds of cosmetic containers (the first container and the second container), the spirit of this disclosure is not limited thereto, and the cosmetic manufacturing apparatus may assemble all known cosmetic containers.

The cosmetic manufacturing apparatus 10 may provide a pump-type container which can discharge cosmetic materials by the pressure provided by a pump, and a compact container which can store cosmetic materials in the impregnating member and provide them through a cosmetic tool such as a powder puff. Hereinafter, the pump-type container will be referred to as the first container, and the compact container will be referred to as the second container.

However, this is only an example, and the types of cosmetic containers that the cosmetic manufacturing apparatus 10 may provide are not limited thereto.

For example, the cosmetic manufacturing apparatus 10 may be configured to provide a stick-type container having an applicator, such as a lip tint, mascara, or the like, and may provide a cosmetic container consisting of a simple cosmetic container main body and a cap, without employing any pump. In other words, the kinds of the first container and the second container do not limit the spirit of this disclosure, but the first container and the second container may be understood as arbitrary cosmetic containers, respectively.

Hereinafter, a detailed configuration of the cosmetic manufacturing apparatus 10 will be described.

Figure 2:
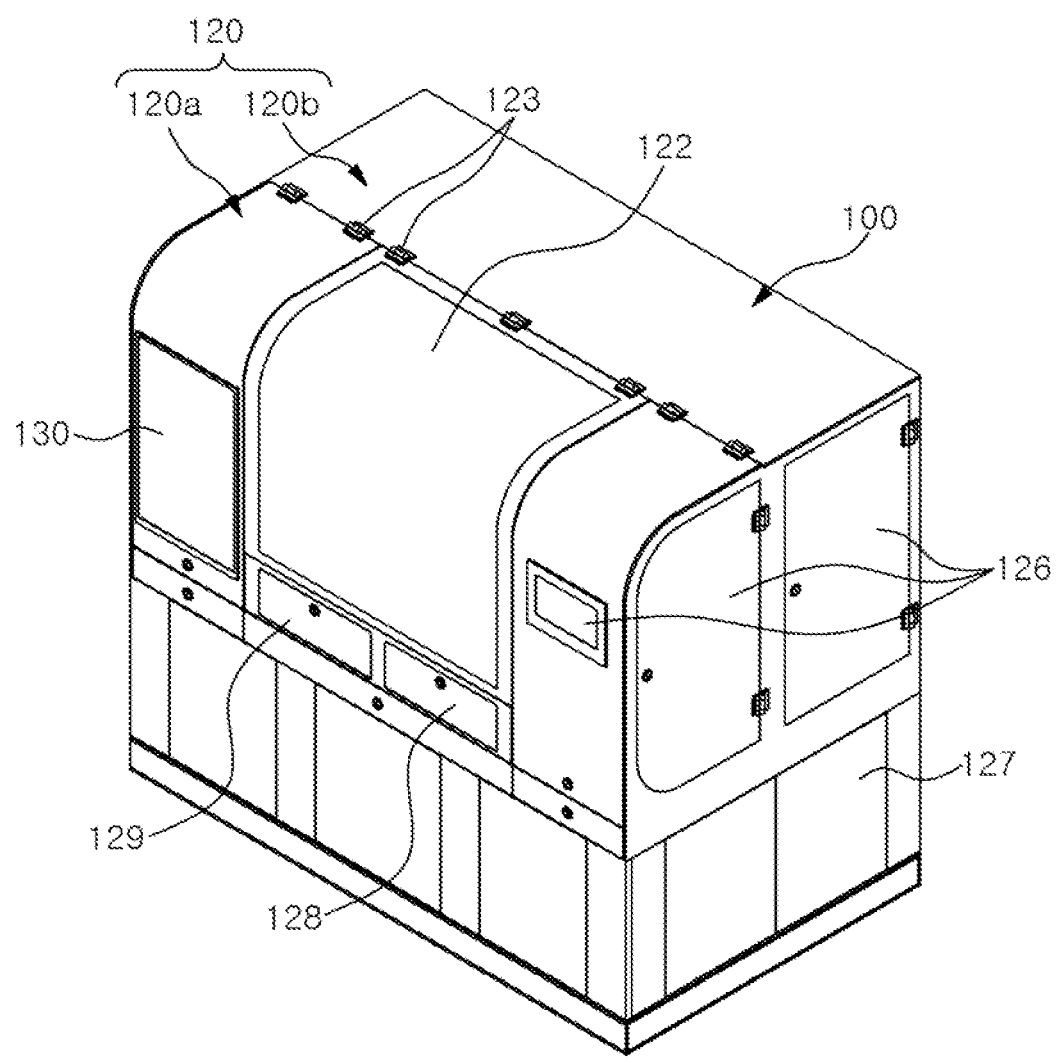
FIG. 2 is a perspective view showing the outer appearance of the cosmetic manufacturing apparatus of FIG. 1.
Figure 3:
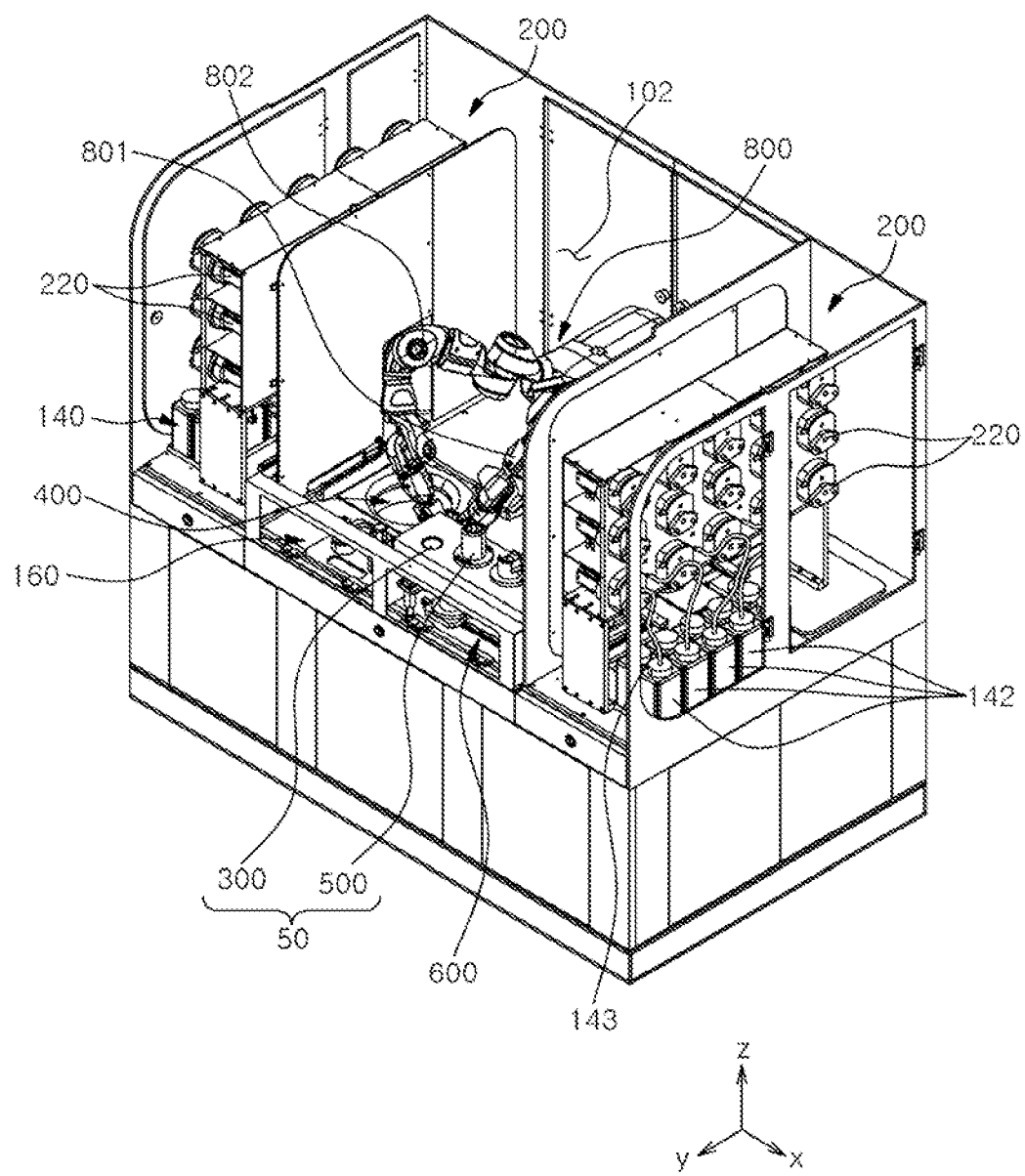
FIG. 3 is a perspective view showing the internal configuration of the cosmetic manufacturing apparatus of FIG. 2.
Figure 4:
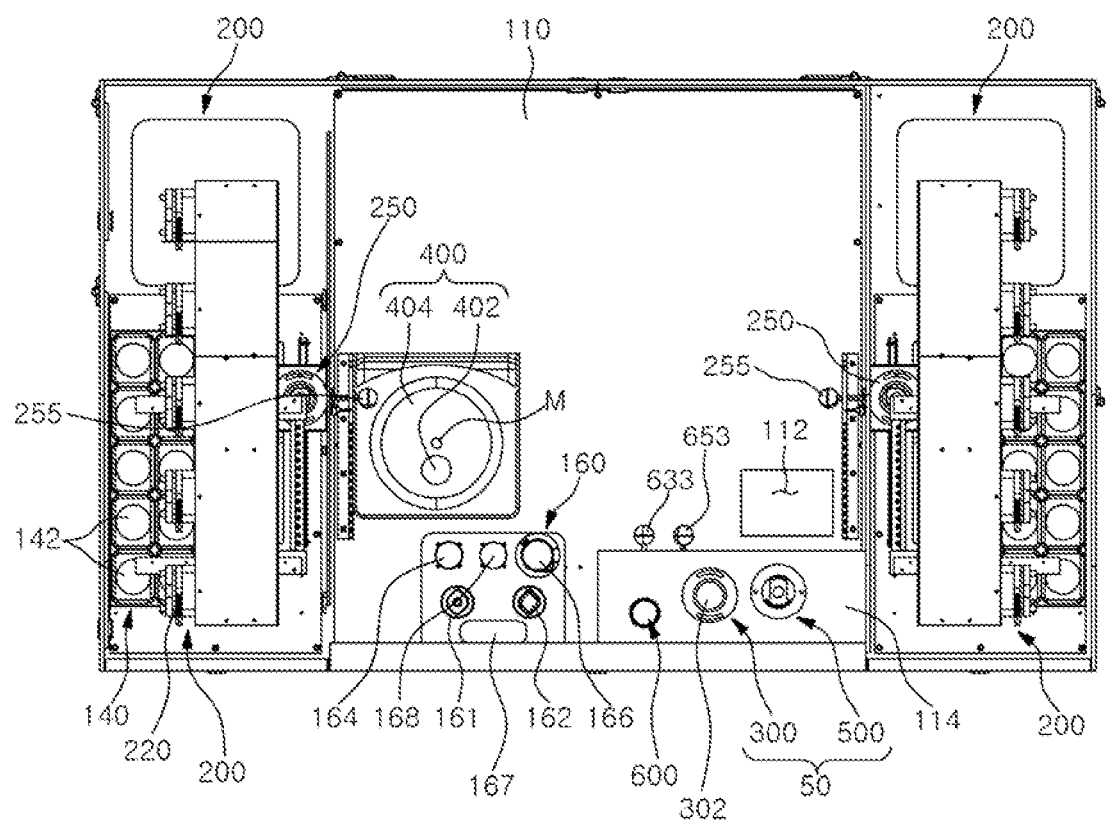
FIG. 4 is a top view (a conveying means is not shown) of the inside of the cosmetic manufacturing apparatus of FIG. 1 when viewed from the top.
Figure 5:
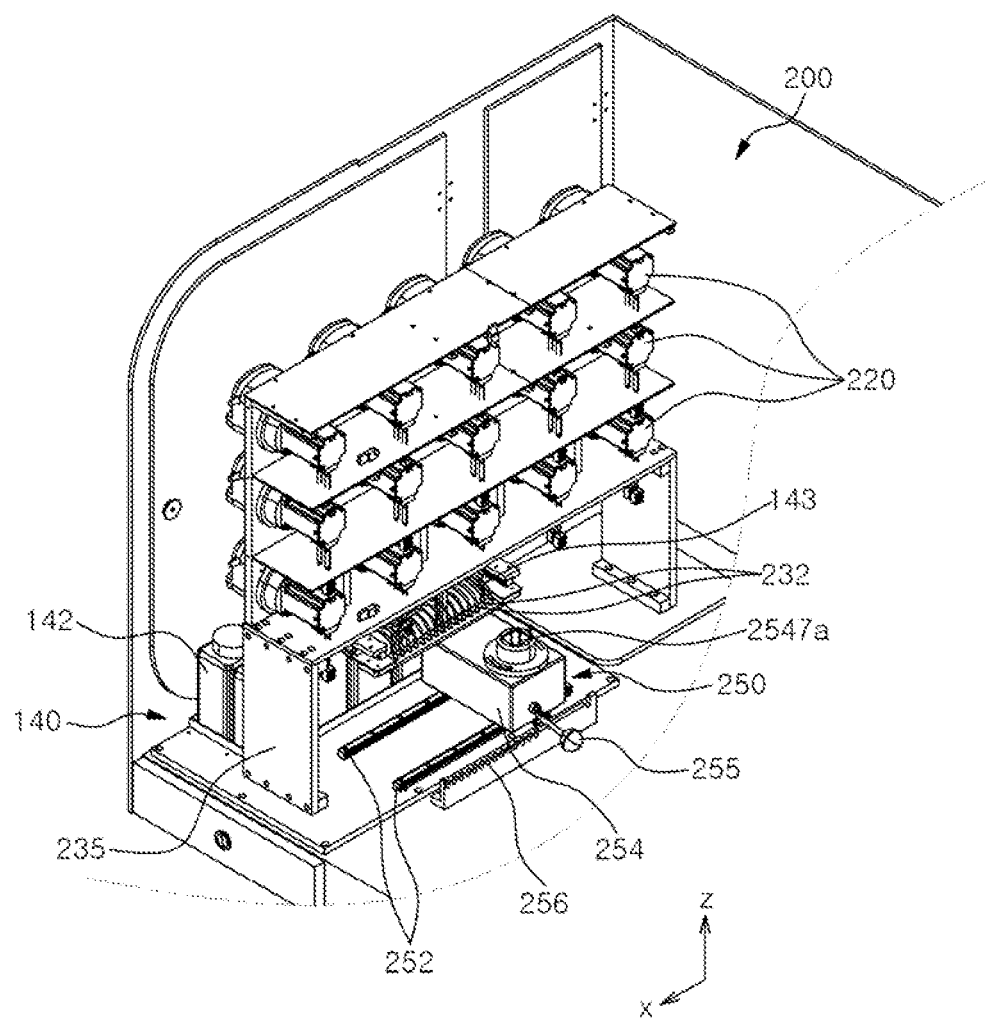
FIG. 5 is a perspective view showing a cosmetic material supply unit disposed on one side of a main body of the cosmetic manufacturing apparatus of FIG. 1.
Figure 7:
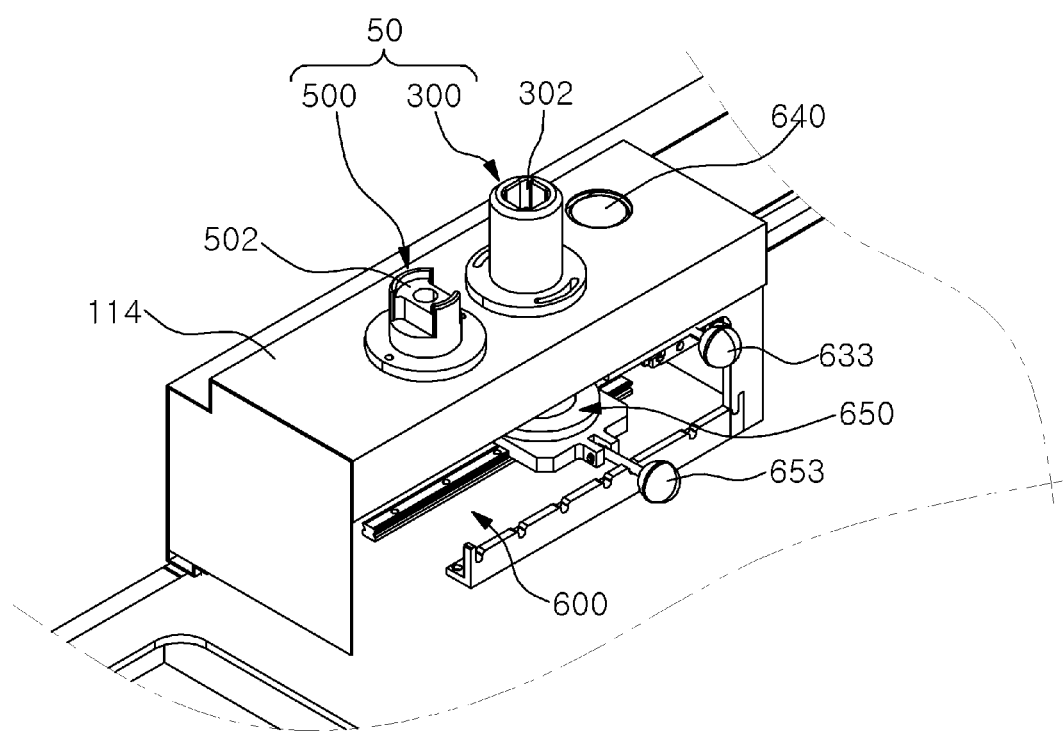
FIG. 7 is a perspective view showing a part holding unit and a moisture absorption unit, which are components of the cosmetic manufacturing apparatus of FIG. 1.
Figure 8:
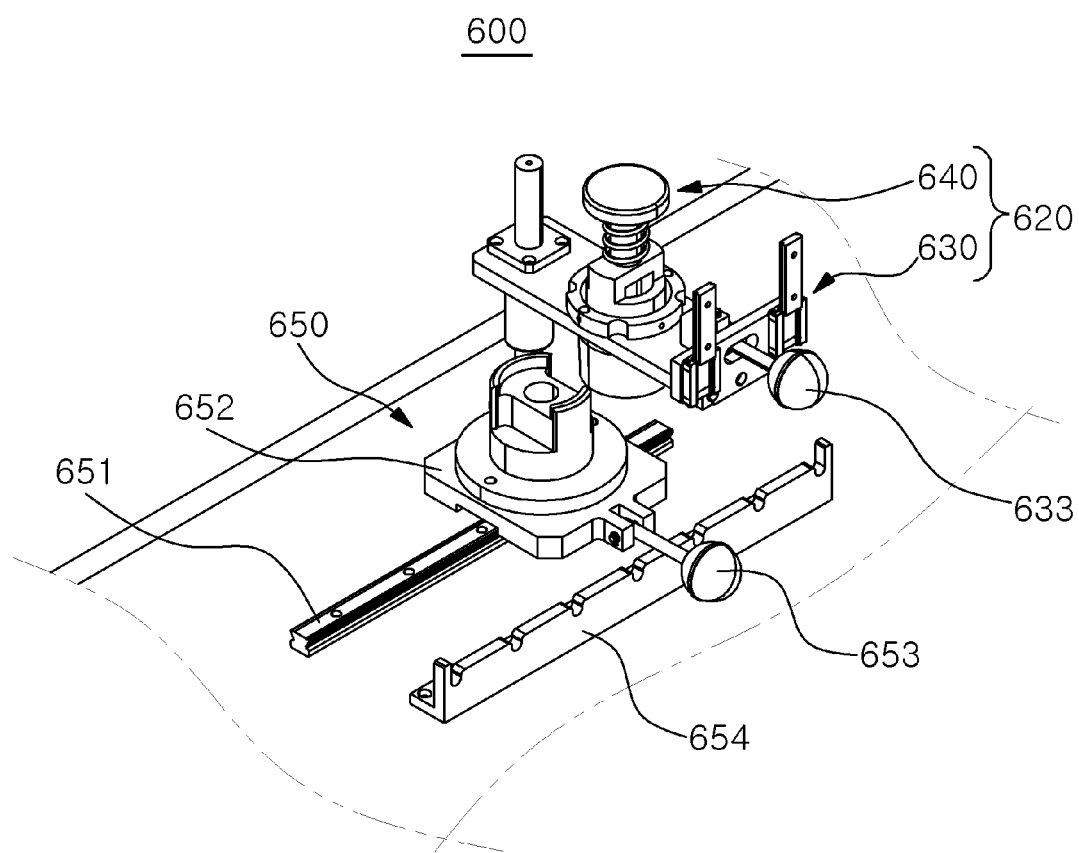
FIG. 8 is a perspective view showing the moisture absorption unit, which is a part of the cosmetic manufacturing apparatus of FIG. 1.
Figure 9:
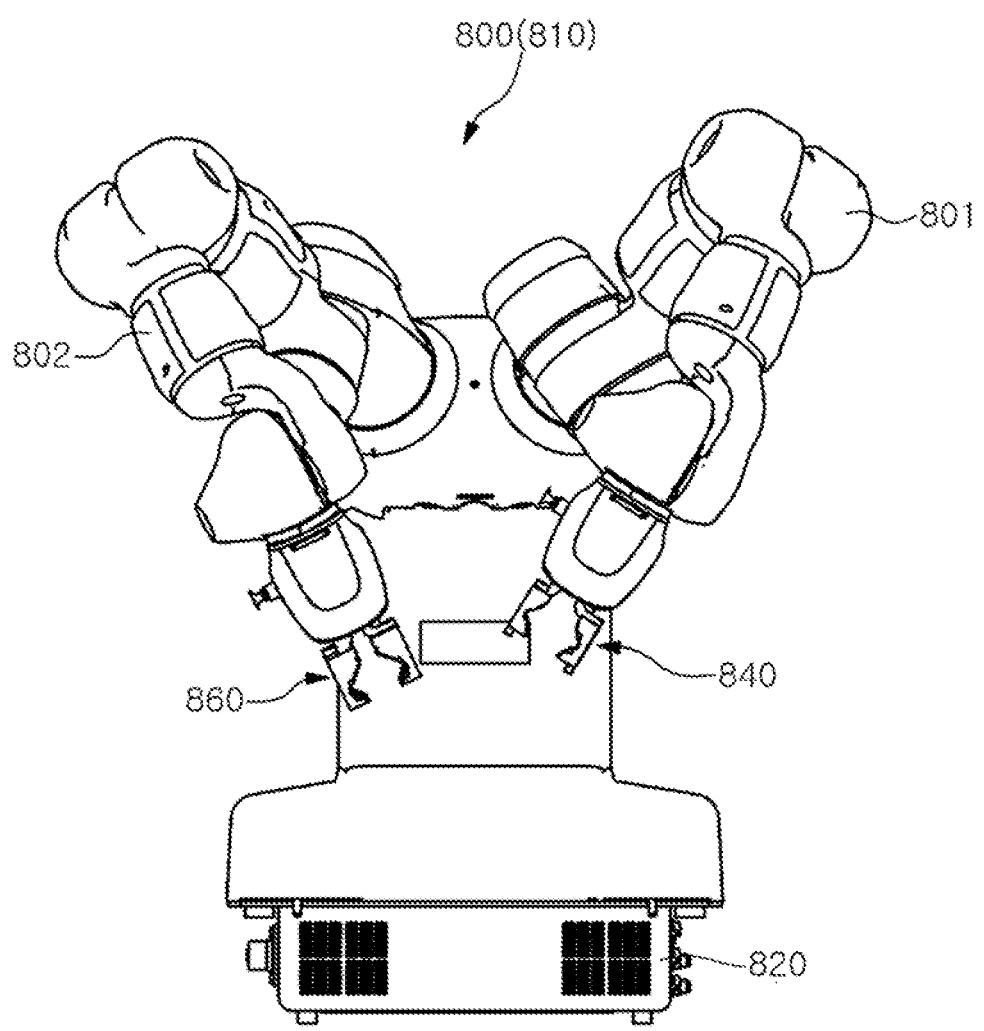
FIG. 9 is a perspective view showing the conveying means, which is a part of the cosmetic manufacturing apparatus of FIG. 1.
Figure 10:
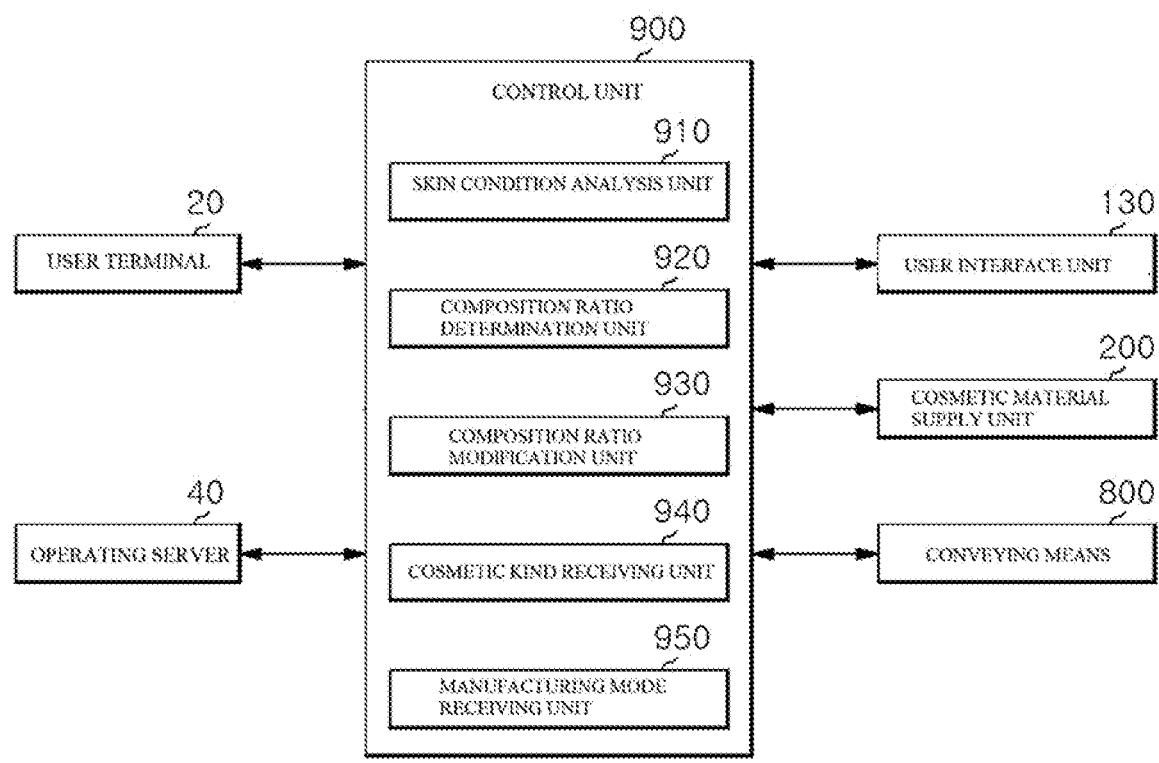
FIG. 10 is a block diagram illustrating a configuration capable of communicating with a control unit of the cosmetic manufacturing apparatus of FIG. 1.

FIG. 2 is a perspective view showing the outer appearance of the cosmetic manufacturing apparatus 10 of FIG. 1; FIG. 3 is a perspective view showing the internal configuration of the cosmetic manufacturing apparatus 10 of FIG. 2; FIG. 4 is a top view (a conveying means is not shown) of the inside of the cosmetic manufacturing apparatus of FIG. 1 when viewed from the top; FIG. 5 is a perspective view showing the cosmetic material supply unit 200 disposed on one side of a main body of the cosmetic manufacturing apparatus of FIG. 1; FIG. 6 is a perspective view showing a part supply unit 160 disposed on another side of the main body of the cosmetic manufacturing apparatus of FIG. 1; FIG. 7 is a perspective view showing a part holding unit 50 and a moisture absorption unit 600, which are parts of the cosmetic manufacturing apparatus of FIG. 1; FIG. 8 is a perspective view showing the moisture absorption unit, which is a part of the cosmetic manufacturing apparatus of FIG. 1; FIG. 9 is a perspective view showing the conveying means, which is a part of the cosmetic manufacturing apparatus of FIG. 1; and FIG. 10 is a block diagram illustrating a configuration capable of communicating with a control unit of the cosmetic manufacturing apparatus of FIG. 1.

Referring to FIGS. 2 to 10, the cosmetic manufacturing apparatus 10 may include a main body 100 providing a space 102 for manufacturing a cosmetic; a cosmetic material storage unit 140 for storing a plurality of cartridges 142 in which cosmetic materials are stored; a part supply unit 160 which provides a mixing container 161 that can accommodate and mix cosmetic materials, and one or more components that constitute a cosmetic container; a cosmetic material supply unit 200 for supplying cosmetic materials from the cosmetic material storage unit 140 to the mixing container 161; a mixing unit 400 for mixing the cosmetic materials in the mixing container 161 by applying an external force to the mixing container 161 storing the cosmetic materials supplied from the cosmetic material supply unit 200; a part holding unit 50 that provides a space in which the first container and the second container can be assembled; a moisture absorption unit 600 for impregnating the cosmetic material into an impregnating member 168 provided as a component of the compact container; a conveying means 800 capable of moving the component constituting the mixing container 161 or the cosmetic container from one of the cosmetic material supply unit 200, the part supply unit 160, the mixing unit 400, the moisture absorption unit 600, and the part holding unit 50, to another; and the cosmetic manufacturing apparatus may include a control unit 900 capable of providing cosmetics or customized cosmetics to a user by controlling at least one of the cosmetic material supply unit 200, the conveying unit 800, and the mixing unit 400.

Here, the part holding unit 50 may include a seat portion 300 providing a space in which the first container can be assembled, and an assembly portion 500 providing a space in which the second container can be assembled and the seat portion 300 and the assembly portion 500 may be disposed on a table 114.

According to an embodiment, the cosmetic manufacturing apparatus 10 may lack any one or more of the above-described components, and thus the spirit of this disclosure is not limited thereto. For example, when the cosmetic manufacturing apparatus 10 manufactures only the first container, the components of the moisture absorption unit 600 and the assembly portion 500 may be omitted.

As described above, the cosmetic manufacturing apparatus 10 may be understood as a device that mixes cosmetic materials according to the composition ratio, puts the mixed cosmetic materials in a cosmetic container (e.g., a first container or a second container), and provides the cosmetic container to a user.

In this embodiment, the cosmetic manufacturing apparatus 10 will be described by way of example as being installed in a retail store where cosmetics are sold, or any type of store where a user can visit and purchase cosmetics. However, this is only an example, and the spirit of this disclosure is not limited thereto. For example, the cosmetic manufacturing apparatus 10 may be installed in a cosmetic manufacturing plant for mass production, or installed and used for manufacturing cosmetics, in a place other than where cosmetics are sold.

The main body 100 may form the outer appearance of the cosmetic manufacturing apparatus 10, and may provide the cosmetic manufacturing space 102 in which the components (e.g., the part supply unit 160, the cosmetic material supply unit 200, the conveying means 800, the part holding unit 50, the moisture absorption unit 600, and the like) for manufacturing cosmetics are installed. In order to provide the cosmetic manufacturing space 102, the main body 100 may have any three-dimensional appropriate shape, and in this embodiment, it is illustrated by way of example as having a rectangular parallelepiped shape as a whole.

In the cosmetic manufacturing space 102, the above-described cosmetic material storage unit 140, part supply unit 160, cosmetic material supply unit 200, part holding unit 50 (seat portion 300 and mixing unit 400), assembly portion 500, moisture absorption unit 600, conveying means 800 or the lie may be disposed, and these components may be disposed on the base 110 forming the bottom surface of the cosmetic manufacturing space 102. According to the embodiment, it will be apparent that the above-described components may be installed on any wall forming the cosmetic manufacturing space 102.

Further, when the cosmetic manufacturing apparatus 10 is viewed from the top (see FIG. 4), the cosmetic material supply unit 200 may be disposed on the left side and the right side; the part supply unit 160 may be disposed in the front left center; the part holding unit 50 may be disposed in the front right center; and the conveying means 800 may be disposed in the rear center. Additionally, the mixing unit 400 may be disposed at the rear side of the part supply unit 160. In this embodiment, it will be described by way of example that the two cosmetic material supply units 200 are provided in the left and right sides. However, such arrangement and the number of the cosmetic material supply units 200 are merely exemplary, and their arrangement can be changed as long as the conveying means 800 is movable. Here, based on FIG. 3, the front side may be understood as a +y direction and the right side may be understood as a +x direction.

In addition, the part holding unit 50 may be disposed on the top of the table 114, and the moisture absorption unit 600 may be disposed under the table 114.

In addition, the part holding unit 50 may include the seat portion 300 and the assembly portion 500, and the assembly portion 500 is disposed on one side of the table 114 with respect to the seat portion 300, while a pressing part 640 of the moisture absorption part 600 may be exposed another side thereof (see FIG. 4). Here, the pressing unit 640 may be exposed through a hole formed in the table 114, and he conveying means 800 to be described later may press the exposed pressing unit 640. The pressing unit 640 is a configuration used in the process of impregnating the cosmetic material in the impregnating member 168 when the second container is manufactured, and a detailed description thereof will be described later.

The body 100 may include a housing 120 for protecting the cosmetic manufacturing space 102 from the outside space.

Specifically, the housing 120 constituting the main body 100 may include a front housing 120*a* in which the transparent window 122 is disposed, and a rear housing 120*b* connected to the front housing 120*a* through the connecting member 123. Here, the connecting member 123 may be a hinge. Since the user can lift at least a portion of the front housing 120*a* upward, maintenance convenience of the internal configuration of the cosmetic manufacturing apparatus 10 can be improved.

A portion of the housing 120 may be provided with the transparent window 122 to check the cosmetic manufacturing process performed in the cosmetic manufacturing space 102 from the outside. For example, the front central region of the housing 120 may be formed with the transparent window 122, through which all or some of the operation of the conveying means 800 and operations performed in the cosmetic manufacturing space 102 can be disclosed to a user, so that it is possible to increase the user's trust in the customized cosmetics manufactured by the cosmetic manufacturing apparatus 10.

In addition, a user interface unit 130 may be provided on one side of the housing 120. The user interface unit 130 may be configured to provide the user with status information of the cosmetic manufacturing apparatus 10 or the manufacturing process of customized cosmetics and associated information, and to receive preset information from the user. For example, the user interface 130 may be a touch screen, and may include a microphone and a speaker for sound input/output. The position at which the user interface unit 130 is provided on the housing 120 may be set so as not to overlap the transparent window 122, and in this embodiment, it is illustrated by way of example that the interface is provided in the front left region of the main body 100.

The user may perform an operation through the user interface unit 130, such as analyzing user's skin condition, checking the diagnosis result, checking the composition ratio data of a customized cosmetic to be provided to the user, adjusting the composition ratio data of a customized cosmetic to be manufactured, selecting a cosmetic having specific composition ratio data, or the like. In addition, personal information required for personalization of manufactured customized cosmetics may be input.

Additionally, a plurality of opening and closing doors 126 may be provided on at least one side of the housing 120. The user may open the opening/closing door 126 to exchange the cartridges 142 or to maintain components disposed in the cosmetic manufacturing space 102. Further, a lower support 127 capable of storing various articles may be provided on the lower side of the housing 120, which is the cosmetic manufacturing space 102.

In addition, a selectively openable/closable part supply door 129 may be provided on one side of the housing 120. The part supply door 129 may be provided on the front side of the part supply unit 160 to be described later, and may be selectively opened and closed.

In this regard, the part supply door 129 may be provided in a rotating structure or a slide structure having an elastic restoring force, and thus, may be pushed and opened when a tray 165 of the part supply unit 160 is moved to the outside of the main body 100, and then be returned to its original state and be closed when the tray 165 is moved into the interior of the main body 100.

In addition, the user or a separate robot may open the part supply door 129, and place the components constituting the first container (e.g., the mixing container 161 and the discharging member 162) and the components constituting the second container (e.g., the base container 164, the impregnating member 168, and the cover container 166) in the part supply unit 160. Additionally, when the assembled first container or second container is placed on the part supply unit 160, the user may open the part supply door 129 and take out the assembled finished product.

In addition, a moisture absorption door 128 that can be selectively opened and closed may be provided on another side of the housing 120. By providing such moisture absorption unit door 128, it is possible to increase the maintenance convenience of the moisture absorption unit 600 to be described later.

Meanwhile, on the base 110, a recovery portion 112 may be provided for recovering the mixing container 161, which is no longer needed after mixing the cosmetic materials when the cosmetic manufacturing apparatus 10 is used to manufacture the second container. The recovery portion 112 may be disposed adjacent to the assembly portion 500, and may be provided in the form of a hole punched in the base 110, so that the conveying means 800 can simply drop the mixing container 161 after finishing the discharge into the base container 164, from above the recovery portion 112 in order to recover it. In this case, a container (not shown) for recovering the discarded mixing container 161 may be provided under the recovery portion 112.

The cosmetic material storage unit 140 may be disposed on one side of the main body 100, and include a plurality of cartridges 142. In the following description, one side of the main body 100 may be understood as one direction based on the conveying means 800 installed on the base 110, and another side of the main body 100 may be understood as another direction different from the one side. In this embodiment, based on the drawings, the cosmetic material storage unit 140 is illustrated by way of example as being disposed on the left and right sides of the conveying means 800.

Cosmetic materials used as raw materials for cosmetics may be stored in respective cartridges 142. Any one kind of cosmetic material may be divided and provided in a plurality of cartridges 142. The cartridge 142 may be connected to a cosmetic material supply means 220 such as a pump provided in the cosmetic material supply unit 200, and may be replaced when the cosmetic material stored therein is exhausted.

In this embodiment, it is described by way of example that a plurality of cartridges 142 are provided, each cartridge 142 storing a preset type of cosmetic material. The plurality of cartridges 142 may be disposed side by side on one wall of the housing 120, and a portion of the housing 120 may be formed to be openable for replacement of the cartridge 142.

Each cartridge 142 may be connected to the cosmetic material supply means 220 through a tube 143. The cosmetic material stored in the cartridge 142 may be discharged to the mixing container 161 located in a mixing container conveying unit 250 through the cosmetic material supply means 220.

The cosmetic material supply unit 200 may be disposed adjacent to the cosmetic material storage unit 140. Specifically, the cosmetic material supply unit 200 may be disposed on the upper side of the cosmetic material storage unit 140. Here, the upper side may be understood as a +z direction based on FIG. 3.

The cosmetic material supply unit 200 may discharge the cosmetic material stored in the cartridge 142 to the mixing container 161 in the mixing container conveying unit 250 according to the composition ratio generated by the control unit 900. Here, the composition ratio may be preset and stored in a memory (not shown), received from the terminal 20 and the operating server 40, or be calculated by the control unit 900 based on the received data.

In addition, the cosmetic material supply unit 200 may be provided in plurality so as to be separated in an independent space. In this embodiment, it will be described by way of example that the two cosmetic material supply units 200 are provided in the left and right sides of the main body 100, respectively.

Each cosmetic material supply unit 200 may include a cosmetic supply means 220 for conveying the cosmetic material stored in the cartridge 142 by providing power for supplying the cosmetic material; a plurality of discharging hole 232 through which the cosmetic material conveyed from the cosmetic material supply means 220 is discharged; and a mixing container conveying unit 250 movably provided under the plurality of discharging holes 232 with the mixing container 161 fixed therein (see FIG. 5).

The cosmetic supply means 220 may suck the cosmetic material from the cartridge 142 at a preset speed and discharge the cosmetic material to the mixing container 161. For example, the cosmetic supply means 220 may include a peristaltic pump capable of fine flow control.

In this case, the cosmetic material suction and discharge speed of the cosmetic supply means 220 may be changed according to a preset condition or control of the control unit 900. For example, the control unit 900 may adjust the supply flow rate and flow velocity by controlling the peristaltic pump provided as the cosmetic supply means 220 according to the amount of the cosmetic material injected into the mixing container 161.

The cosmetic supply means 220 may be supported by the cosmetic material supply unit support 235, and the mixing container conveying unit 250 may be provided under the cosmetic supply means 220.

Here, the discharging hole 232 through which the cosmetic material is discharged may be provided on one side of the cosmetic material supply unit support 235, and the mixing container conveying unit 250 is moved to the lower side of the discharging hole 232 so that the cosmetic material can be received in the mixing container 161.

A connection flow path may be provided between the cosmetic supply means 220 and the discharging hole 232 through which the cosmetic material is discharged. Here, when the cosmetic supply means 220 is provided as a peristaltic pump, the connection flow path may be the tube 143. That is, the tube 143 may be understood as a means for connecting the cartridge 142 and the discharging hole 232 through the cosmetic supply means 220.

The cosmetic supply means 220 may be provided in a number corresponding to respective cartridges 142. For example, one cosmetic supply means 220 may be connected to one cartridge 142, and each cosmetic supply means 220 may adjust the discharge amount of the cosmetic material stored in the cartridge 142.

The cosmetic supply means 220 may discharge the cosmetic material stored in the cartridge 142 to the mixing container 161 seated in the mixing container conveying unit 250.

The mixing container conveying unit 250 may include a seat groove 2547a for a mixing container into which the mixing container 161 is inserted. In addition, the mixing container conveying unit 250 may reciprocate along a direction (y-axis direction) in which the plurality of discharging holes 232 are arranged.

The mixing container conveying unit 250 may have the mixing container 161 seated in the mixing container seat groove 2547a, and allow the mixing container 161 to receive the cosmetic materials discharged from the plurality of discharging holes 232 while reciprocating under the discharging holes 232 (see FIG. 5). Here, the number of the discharging holes 232 may be equal to or greater than that of the cosmetic supply means 220.

The mixing container conveying unit 250 may move to the next discharging hole 232 after waiting for a preset period of time under each discharging hole 232. While the mixing container conveying unit 250 waits for the preset period of time, the cosmetic material may be discharged from the discharging hole 232 to the mixing container 161.

Specifically, the mixing container conveying unit 250 may include a movable block 254 for a mixing container that is moved along a guide rail 252 for a mixing container; a seat groove 2547a for a mixing container provided on the movable block 254 for a mixing container and capable of fixing the mixing container 161 thereon; and a locking lever 255 for a mixing container that extends from the movable block 254 for a mixing container and can be gripped by the conveying means 800.

In addition, the guide rail 252 for a mixing container extending along the arrangement direction (y direction) of the discharging holes 232 may be provided at the lower side of the mixing container conveying unit 250, and a stopper 256 for a mixing container, through which the locking lever 255 for a mixing container can be caught, may be provided at the lower side of the locking lever 255 for a mixing container. Here, the guide rail 252 for a mixing container and the stopper 256 for a mixing container may be understood as being installed on the base 110. In addition, the stopper 256 for a mixing container may be provided with a plurality of grooves into which the locking lever 255 for a mixing container can be fitted. The spacing of the plurality of grooves corresponds to the spacing of the discharging holes of the cosmetic supply means 220.

In this embodiment, the movement of the movable block 254 for a mixing container is described by way of example as being made by the conveying means 800. For example, after gripping the locking lever 255 for a mixing container which extends from the movable block 254 for a mixing container, the conveying means 800 may reciprocate it in the y-axis direction.

After the conveying means 800 grips the locking lever 255 for a mixing container, and releases the movable block 254 for a mixing container from the constrained state, and then moves the movable block 254 for a mixing container, it may insert the locking lever into the groove of the stopper 256 for a mixing container at a different position, constraining the movable block 254 for a mixing container again, so that the mixing container 161 can stably be maintained the at corresponding position while the cosmetic material is discharged. In this case, while the movable block 254 for a mixing container is fixed to the stopper 256 for a mixing container and any one cosmetic material is discharged to the mixing container 161, the conveying means 800 can freely perform other operations. Therefore, it is possible to shorten the manufacturing time by efficiently configuring the overall manufacturing process.

According to an embodiment, the movement and position maintenance of the movable block 254 for a mixing container may be implemented by a separately provided driving device. For example, the movable block 254 for a mixing container may be a movable block provided to a linear motor guide. In this case, the control unit 900 controls the linear motor guide to allow the mixing container 161 seated on the movable block 254 for a mixing container to receive the cosmetic material provided through the cosmetic supply means 220, at a static position.

Meanwhile, a weight sensor capable of measuring a change in weight of the mixing container 161 may be further provided inside the movable block 254 for a mixing container. As the cosmetic material is injected into the mixing container 161 by the cosmetic material supply unit 200, the weight of the mixing container 161 may change, and the control unit 900 may adjust the supply speed of the cosmetic material through the cosmetic material supply unit 200 according to the results measured by the weight sensor.

The part supply unit 160 may supply components of the cosmetic containers (e.g., the first container and the second container) that can be assembled in the cosmetic manufacturing apparatus 10.

Specifically, the part supply unit 160 may include a tray 165 on which components can be placed; a first container component support 163 capable of supporting a component for forming the first container; and a second container component support 169 capable of supporting a component for forming the second container.

Hereinafter, those supplied by the part supply unit 160, such as components constituting the mixing container 161 and the cosmetic container, will be collectively referred to as "parts".

The tray 165 may be provided on the base 110, and be movable such that at least a portion of the tray 165 can be exposed to the outside of the main body 100. For example, the tray 165 may be able to slide to the outside of the main body 100 through the part supply door 129.

In this case, the user or a separate robot can easily place a component constituting the first container and a component constituting the second container on the part supply unit 160, and the first container and the second container can be easily discharged to the outside of the main body 100 after finishing their assembly.

The first container component support 163 may include a mixing container support 163a capable of supporting the mixing container 161; and a discharging member support 163b capable of supporting the discharging member 162.

The mixing container support 163a may be provided with a groove into which the mixing container 161 can be inserted. The discharging member support 163b may be provided with a groove into which the straw 1622 can be inserted, so that the discharging member 162 can be supported.

The second container component support 169 may include a base container support 169a capable of supporting the base container 164; an impregnating member support 169b capable of supporting the impregnating member 168; and a cover container support 169c that can support the cover container 166.

In addition, a groove 167 may be provided on the front surface of the tray 165, and the assembled first container or the second container may be placed in the groove 167 of the tray 165.

In this embodiment, the first container may be understood as being formed by assembling the mixing container 161 with the discharging member 162.

Specifically, the discharging member 162 may include a pumping part 1621 that generates a pressure difference to provide a force capable of conveying the fluid; a straw 1622 connected to the pumping part 1621 and inserted into the mixing container 161 to suck the cosmetic material stored in the mixing container 161; and a cap 1623 capable of sealing the inlet 1611 of the mixing container 161.

The mixing container 161 may provide a space for storing cosmetic materials, and may include an inlet 1611 into which a straw 1622 can be inserted.

The mixing container 161, which is a part of the first container, may be used for storing cosmetic materials of the finished product. That is, the mixing container 161 may be used as a part of customized cosmetic container after having been used for mixing cosmetics.

Additionally, the second container may be understood as being formed by assembling the base container 164, the impregnating member 168, and the cover container 166 with one another.

Specifically, the base container 164 may accommodate the impregnating member 168 provided with cosmetics and a sponge, and the cover container 166 may selectively seal the impregnating member 168 in the base container 164.

A makeup tool such as a powder puff may be provided in advance in the cover container 166.

Specifically, the cover container 166 may include an inner cover coupled to the base container 164 to support the makeup tool and cover the impregnating member 168, and an outer cover to protect the entire container by covering the makeup tool. The inner cover and the outer cover may each rotate to shield the impregnating member 168 or the makeup tool.

Additionally, the cosmetic manufacturing space 102 may be provided with the part holding unit 50 where the first container and the second container can be assembled (see FIG. 7).

Specifically, the part holding unit 50 may include a seat portion 300 where the first container can be assembled; and an assembly portion 500 where the second container can be assembled. The part holding unit 50 may be provided on the top of the table 114, and a hole through which the pressing unit 640 and which is spaced apart from the part holding unit 50 by a predetermined distance may be exposed may be provided in the table 114.

The seat portion 300 may be a position where the mixing container 161 temporarily waits before moving to the next process in the manufacturing process of the customized cosmetic, or be used for supporting the mixing container 161 during the assembly of the first container. When two robot arms are used as the conveying means 800 as in this embodiment, the seat portion 300 may disposed at a position where both robot arms can access it, thereby conveying parts between the two robot arms.

Specifically, the mixing container 161 may be formed in a structure having an edge in its longitudinal section, and the mixing container seat groove 302 having a shape corresponding to the shape of the mixing container 161 may be provided in the seat portion 300. The conveying means 800 may perform a process of changing the direction of the mixing container 161 to a preset direction so that the mixing container 161 can be accurately fitted into the mixing container seat groove 302, and then seating the mixing container 161 therein. As a result, the mixing container 161 may always be positioned at a preset position, and stably maintain its posture during the coupling process with the discharging member 162 against an external force in the rotational direction.

The assembly portion 500 may provide a location and space for manufacturing cosmetics as a finished product by assembling components constituting the cosmetic container to one another. In this embodiment, it is described by way of example that the second container is assembled in the assembly portion 500. That is, although in this embodiment the assembly of the first container is performed in the seat portion 300, and the assembly of the second container is performed in the assembly portion 500, the spirit of this disclosure is not limited thereto. For example, both the assembly of the first container and the assembly of the second container may be performed in the seat portion 300. In this case, the seat portion 300 may be understood as the assembly portion 500. Alternatively, both the assembly of the first container and the assembly of the second container may be performed in the assembly portion 500. A detailed assembly process of each container will be described later.

The coupling of the base container 164, the impregnating member 168, and the cover container 166 (assembly of the second container) may occur on the assembly portion 500. Specifically, the base container 164 may be located on the assembly portion 500 by the conveying means 800; the cosmetics stored in the mixing container 161 may be put into the base container 164; the impregnating member 168 may be placed on the base container 164; the moisture absorption unit 600 may be subjected to the moisture absorption process; and then the cover container 166 may be coupled to the base container 164 to cover the impregnating member 168. A more detailed description thereof will be given below.

The assembly portion 500 may include a base container seat groove 502 in which the base container 164 can be seated so as to receive the cosmetic materials mixed in the mixing container 161 during the assembly process of the second container. The conveying means 800 may grip the base container 164 on the part supply unit 160, and move it to the base container seat groove 502. After the mixing container 161 in which mixing is completed is conveyed by the conveying means 800 from the seat portion 300 or the mixing unit 400, the cosmetic materials may be discharged to the base container 164 on the assembly portion 500.

Specifically, the base container 164 may be formed in a structure having an edge in at least one portion or a cylindrical shape, and the base container seat groove 502 may have a shape corresponding to the cornered structure or cylindrical shape of the base container 164. The conveying means 800 may perform a process of seating the base container 164 after changing the direction of the base container 164 to a preset direction so that the base container 164 can be accurately fitted in the base container seat groove 502. As a result, the base container 164 may always be positioned at a preset position, and stably maintain its posture during the coupling process with the cover container 166 against an external force in the rotational direction.

In addition, the impregnating member 168 may be accommodated by the conveying means 800 in the base container 164 seated on the assembly portion 500, after completing the accommodation of the mixed cosmetic materials. The base container 164 in which the accommodation of the impregnating member 168 has been completed may be moved to the moisture absorption unit 600 by the conveying means 800 again to be subjected to a moisture absorption process.

In the moisture absorption unit 600, a process of impregnating the cosmetic materials into the impregnating member 168 included in the second container may be performed. The base container 164 on the assembly portion 500, in which the accommodation of the cosmetic materials and the loading of the impregnating member 168 has been completed, may be moved to the moisture absorption unit 600 where the cosmetic materials may be sufficiently impregnated into the impregnating member 168 by the moisture absorption tool 620 provided in the moisture absorption unit 600. The moisture absorption tool 620 may perform the impregnation action by repeatedly performing the process of pressing the impregnating member 168 to a preset pressure.

The moisture absorption unit 600 may include a moisture absorption tool 620 and a base container conveying unit 650 (see FIG. 8).

The moisture absorption tool 620 may be understood as a configuration capable of impregnating a cosmetic material into the impregnating member 168 by pressing the impregnating member 168 inserted into the base container 164.

The base container conveying unit 650 may be understood as a configuration for seating the base container 164 moved from the assembly portion 500 thereon and then moving it to the lower side of the moisture absorption tool 620. Cosmetic materials and the impregnating member 168 are accommodated in the base container 164 seated on the base container conveying unit 650.

The moisture absorption tool 620 may include an static holder 630 capable of fixing the base container 164 seated on the base container conveying unit 650 by ascending and descending in the height direction (z direction) from the bottom of the table 114, and a pressing unit 640 capable of pressing the impregnating member 168 on the top of the base container 164 fixed by the static holder 630. Here, the table 114 may have a hole through which the pressing unit 640 may be exposed, and the conveying means 800 may allow the impregnating member 168 to be impregnated by pressing the exposed pressing unit 640.

Additionally, the base container conveying unit 650 may include a movable block 652 for the base container on which the base container 164 is seated, a guide rail 651 for the base container providing a path along which the movable block 652 for the base container moves, a locking lever 653 for the base container for moving the movable block 652 for the base container, a stopper 654 for the base container that can fix the locking lever 653 for the base container at a preset position. Here, the conveying means 800 may grip the locking lever 653 for the base container, and move the movable block 652 for the base container on which the base container 164 is seated to the lower end of the pressing unit 640.

The moisture absorption unit 600 may include the base container conveying unit 650 which receives the base container 164 provided by the conveying means 800 from the assembly portion 500, and moves it to a position where the moisture absorption is performed by the moisture absorption tool 620.

The base container 164 whose moisture absorption has been completed in the moisture absorption unit 600 may be conveyed back to the assembly portion 500 by the conveying means 800, and seated thereon, and the conveying means 800 may convey the cover container 166 from the part supply unit 160 and couple it to the base container 164. The coupling of the base container 164 and the cover container 166 may be achieved by mechanical fitting coupling such as hook coupling, and for this, the conveying means 800 may apply a predetermined external force to the cover container 166. A more detailed description of the moisture absorption unit 600 will be described in more detail with reference to FIGS. 15 to 18 to be described later.

The mixing unit 400 is a component that applies an external force to the mixing container 161 in which the cosmetic materials are received through the cosmetic material supply unit 200 so that the cosmetic materials can be well mixed in the mixing container 161.

The mixing unit 400 may be rotatable to mix the cosmetic materials accommodated in the mixing container 161.

In this embodiment, the mixing unit 400 is described by way of example as being a device for mixing cosmetic materials by revolving the mixing container 161 at a high speed while rotating it on its axis at the same time.

Specifically, the mixing unit 400 may include a rotatable first rotating member 402 into which the mixing container 161 can be inserted; and a second rotating member 404 capable of rotating the first rotating member 402. Here, the first rotating member 402 may be spaced apart from the center M of the second rotating member 404 by a predetermined distance, and the first rotating member 402 may be stopped at a position preset by the control unit 900.

In this case, the conveying means 800 may insert the mixing container 161 into the first rotating member 402 when it is located at a preset position, thereby facilitating the control of the conveying means 800.

After accommodating the mixing container 161, the mixing unit 400 may be operated for a preset period of time under the control of the control unit 900, and when the mixing process in the mixing unit 400 is completed, the mixing container 161 may be moved to a subsequent process position by the conveying means 800.

In addition, the conveying means 800 may grip the mixing container 161 which contains no cosmetic material therein and is placed on the part supply unit 160, and move it to the mixing container conveying unit 250 of the cosmetic material supply unit 200. At this time, when moving the mixing container 161 to the mixing container conveying unit 250 disposed on one side (the left side of FIG. 4) of the main body 100, it can be directly moved from the part supply unit 160 to the mixing container conveying unit 250, while, when moving the mixing container 161 to the mixing container conveying unit 250 disposed on another side (the right side of FIG. 4) of the main body 100, it may be moved from the part supply unit 160 through the seat portion 300 to the mixing container conveying unit 250.

In addition, the conveying means 800 may move the mixing container 161 to the seat portion 300 after the receiving of the cosmetic material has been finished for a mixing container on the mixing container conveying unit 250 or the mixing process for a mixing container has been performed in the mixing unit 400.

In addition, the conveying means 800 may assemble the first container by coupling the discharging member 162 to the mixing container 161 seated on the seat portion 300, or may assemble the second container through processes of seating the base container 164 on the assembly part 500, pouring the cosmetic materials accommodated in the mixing container 161 to the base container 164, putting the impregnating member 168 into the mixing container 161, impregnating the cosmetic materials into the impregnating member 168 through the moisture absorption unit 600, and covering the base container 164 containing the impregnating member 168 with the cover container 166.

In addition, the conveying means 800 may place the assembled first container or the second container in the groove 167 of the part supply unit 160.

In addition, the conveying means 800 may push the tray 165 of the part supply unit 160 so that at least a portion of the tray 165 is exposed to the outside of the main body 100, thereby presenting to a user the first container or the second container that has been assembled.

The conveying means 800 may include a plurality of conveying units 801, 802 that may move the component provided in the part supply unit 160 to the part holding unit 50, and assemble the component moved to the part holding unit 50 into the first container to be provided as a pump-type container, or into the second container to be provided as a compact type container. Although, in this embodiment, two conveying units 801 and 802 are provided as the conveying means 800, the number of conveying units is not limited thereto as long as it is one or more.

Generally, the conveying means 800 may include a first conveying unit 801 and a second conveying unit 802 that are movable independently of each other.

When assembling the first container to form a pump-type container, one of the first conveying unit 801 and the second conveying unit 802 may grip the cap 1623 of the discharging member 162, and the other may be moved up and down while being in contact with the straw 1622, such that the straw 1622 of the discharging member 162 is aligned with the inlet portion 1611 of the mixing container 161 in the part holding unit 50.

When assembling the second container to form a compact container, one of the first conveying unit 801 and the second conveying unit 802 may seat the base container 164 constituting the second container on the part holding unit 50, and the other may turn over the mixing container 161, such that the cosmetic materials accommodated in the mixing container 161 can be moved to the base container 164.

The conveying means 800 may move parts between the components disposed on the above-described base 110. As described above, in this embodiment, the robot arm is provided by way of example as the conveying means 800. Specifically, the conveying means 800 may include a first conveying unit 801 that may correspond to one robot arm and a second conveying unit 802 that may correspond to another robot arm. The first conveying unit 801 and the second conveying unit 802 may be provided as a multi-articulated robot arm 810, respectively, and the degree of freedom that the articulated robot arm 810 may have may be provided differently depending on an embodiment. In this embodiment, a device having 6 degrees of freedom is used by way of example as the articulated robot arm 810.

The first conveying unit 801 and the second conveying unit 802 may be connected to one robot arm control unit 820, and extend from the robot arm control unit 820. The robot arm control unit 820 may control the first conveying unit 801 and the second conveying unit 802 according to the control of the control unit 900 to perform a preset function.

As there are various types of known articulated robot arms, detailed information related to the structure and control of the robot arm 810 will be omitted in this embodiment.

Meanwhile, a first gripper 840 is provided to the first conveying unit 801, and a second gripper 860 is provided to the second conveying unit 802. The first gripper 840 and the second gripper 860 may have a structural shape suitable for the functions to be performed by the first conveying unit 801 and the second conveying unit 802, respectively. Specific details related to the grippers 840 and 860 will be described later.

What has been described as a function and operation of the conveying means 800 in the above description may be performed by any one or both of the first conveying unit 801 and the second conveying unit 802. The conveying unit used for each function and operation may be selected differently depending on the arrangement of the components.

The first conveying unit 801 and the second conveying unit 802 may perform differently operation for moving the mixing container 161 provided in the part supply unit 160 to the cosmetic material supply unit 200, depending on the position where the cosmetic material supply unit 200 is disposed.

Specifically, in the case of accommodating the cosmetic material in the mixing container 161 from the cosmetic material supply unit 200 disposed on one side (the left side of FIG. 4), the second conveying unit 802 may grip the mixing container 161 disposed in the part supply unit 160, and move the mixing container 161 directly to the mixing container conveying unit 250 disposed at one side.

Additionally, in the case of accommodating the cosmetic material in the mixing container 161 from the cosmetic material supply unit 200 disposed on another side (the right side of FIG. 4), the second conveying unit 802 may grip the mixing container 161 disposed in the part supply unit 160, and seat the mixing container 161 on the seat portion 300. Thereafter, the first conveying unit 801 may grip the mixing container 161 seated on the seat portion 300, and move the mixing container 161 to the mixing container conveying unit 250 disposed on the other side.

In this way, the first conveying unit 801 and the second conveying unit 802 may be in charge of the work performed on one side and the work performed on another side inside the cosmetic manufacturing space 102, respectively.

The first conveying unit 801 may move parts from any one of the cosmetic material supply unit 200 disposed on the other side, the seat portion 300, the assembly portion 500, and the moisture absorption unit 600 to another thereof, or may perform an operation necessary for assembling the first container and the second container (including the moisture absorption process).

Specifically, the first conveying unit 801 may convey the mixing container 161 from the seat portion 300 to the mixing container conveying unit 250 disposed on the other side, move the mixing container conveying unit 250 under the cosmetic material supply unit 200 disposed on the other side, assemble the discharging member 162 to the mixing container 161 seated on the seat portion 300, provide the impregnating member 168 to the base container 164 seated on the assembly portion 500, convey the base container 164 from the assembly portion 500 to the moisture absorption unit 600, move the base container 164 in the moisture absorption unit 600 according to a preset order, convey the base container 164 and the impregnating member 168 in a state in which moisture absorption has been completed from the moisture absorption unit 600 back to the assembly portion 500, or couple the cover container 166 to the base container 164 seated on the assembly portion 500.

To this end, the first gripper 840 may have a structure capable of gripping and moving respective parts. In addition, the first gripper 840 may include a structure capable of operating the base container conveying unit 650 provided for conveying the base container 164 on the moisture absorption unit 600. Further, the first gripper 840 may also have a function of coupling the discharging member 162 to the mixing container 161 seated on the seat portion 300 by rotation.

Additionally, the second conveying unit 802 may move parts from any one of the part supply unit 160, the cosmetic material supply unit 200 disposed on one side, the seat portion 300, the mixing unit 400, and the assembly portion 500 to another thereof, or may perform an operation necessary for assembling the first container and the second container.

Specifically, the second conveying unit 802 may move the mixing container 161 from the part supply unit 160 to the cosmetic material supply unit 200 disposed on one side (the left side of FIG. 4), move the mixing container conveying unit 250 under the cosmetic material supply unit 200, move the mixing container 161 from the cosmetic material supply unit 200 disposed on one side to the mixing unit 400, move the mixing container 161 in which mixing has been completed from the mixing unit 400 to the seat portion 300, assist in assembling the mixing container 161 with the discharging member 162, move the first container which has been assembled in the seat portion 300 or the second container which has been assembled in the assembly part 500 to the groove 167 of the component supply part 160, or provide an external force for moisture absorption in the moisture absorption unit 600.

To this end, the second gripper 860 may have a structure capable of gripping and moving the mixing container 161. In addition, the second gripper 860 may include a structure capable of gripping and moving the locking lever 255 for a mixing container provided to the mixing container conveying unit 250. Further, the second gripper 860 may have a structure for aligning the straw 1622 when the first conveying unit 801 couples the discharging member 162 to the mixing container 161. Also, the second gripper 860 may have a structure for operating the moisture absorption tool 620 of the moisture absorption unit 600.

The operations performed by the first conveying unit 801 and the second conveying unit 802 as described above can be implemented by using the characteristics of the multi-articulated robot arm 810, and various methods for controlling this are known, and detailed descriptions related thereto will be omitted.

Meanwhile, in this embodiment, it is described by way of example that the multi-articulated robot arm 810 is provided as the conveying means 800, but the spirit of this disclosure is not limited thereto. For example, a conveying device capable of linear movement in the three-axis direction may be provided as the conveying means 800, and additional devices for performing the above-described functions may be added thereto.

Meanwhile, the control unit 900 may basically control the above-described components. For example, the control unit 900 may control the movement of the conveying means 800 and the amount of the cosmetic material discharged from the cosmetic material supply unit 200. Additionally, the control unit 900 may include a skin condition analysis unit 910 that analyzes the skin condition from the skin measurement data provided from any one of the terminal 20 and the operating server 40. As described above, the skin condition analysis unit 910 may receive an analysis result according to an embodiment.

In addition, the control unit 900 may include a composition ratio determination unit 920 that determines composition ratio data of cosmetic materials for manufacturing customized cosmetics according to the skin condition analysis result generated by the skin condition analysis unit 910. The composition ratio determination unit 920 may determine the composition ratio by substituting the skin condition analysis result as a variable value in a preset calculation formula, or select and determine the composition ratio closest to or most suitable for the skin condition analysis result from among a plurality of preset composition ratios. The preset composition ratio data may be understood as including the kinds and amounts of cosmetic materials to be used and the input ratios thereof, and in order for a user to intuitively understand this, and include data on physical properties such as color or viscosity of cosmetics corresponding to each composition ratio data.

In this case, the control unit 900 may include a composition ratio modification unit 930 that provides a user with an opportunity to modify the composition ratio data by providing the determined composition ratio to the user through a user interface unit 130. The user may check the composition ratio data presented through the user interface unit 130, determine whether to accept it as it is or use other composition ratio data, and input the modified data. At this time, the composition ratio data presented to the user may be the ratio itself, or may be characteristic information such as color or physical properties of cosmetics manufactured according to the composition ratio data. Accordingly, the modified data input by the user may also be characteristic information such as color or physical properties of cosmetics. According to an embodiment, the composition ratio modification unit 930 may transmit data to the terminal 20 instead of the user interface unit 130, and receive the modified data through the terminal 20.

Additionally, the control unit 900 may include a cosmetic kind receiving unit 940 receiving a desired kind of cosmetic from the user, a manufacturing mode receiving unit 950 receiving a desired manufacturing mode, and a composition ratio determination unit 920. In this embodiment, the information provided to the cosmetic kind receiving unit 940 may be related to whether the kind of customized cosmetic to be manufactured is the first container or the second container, or the information provided to the manufacturing mode receiving unit 950 may be related to whether the mode is one of receiving samples or one of receiving finished products. Here, the sample is a cosmetic manufactured by using a relatively small amount while maintaining the composition ratio of the cosmetic, and the finished product refers to a cosmetic filled with a preset capacity to be provided as a single sale product.

Additionally, the manufacturing mode may further include a mode for requesting a finished product after receiving a sample, a mode for requesting a sample according to the changed composition ratio after receiving a sample, and a mode for requesting discard after receiving a sample. These manufacturing modes may be presented to the user upon receipt of the sample.

A user may select a kind of cosmetic or a manufacturing mode through the user interface unit 130. To this end, the user interface unit 130 may present a screen for receiving the kind of cosmetic and the manufacturing mode selected by the user. Also, according to an embodiment, the user may provide the cosmetic kind or manufacturing mode to the cosmetic manufacturing apparatus 10 through the terminal 20 or the operating server 40.

Hereinafter, with reference to the drawings, a method of controlling a cosmetic manufacturing apparatus having the above-described configuration will be described.

Figure 11:
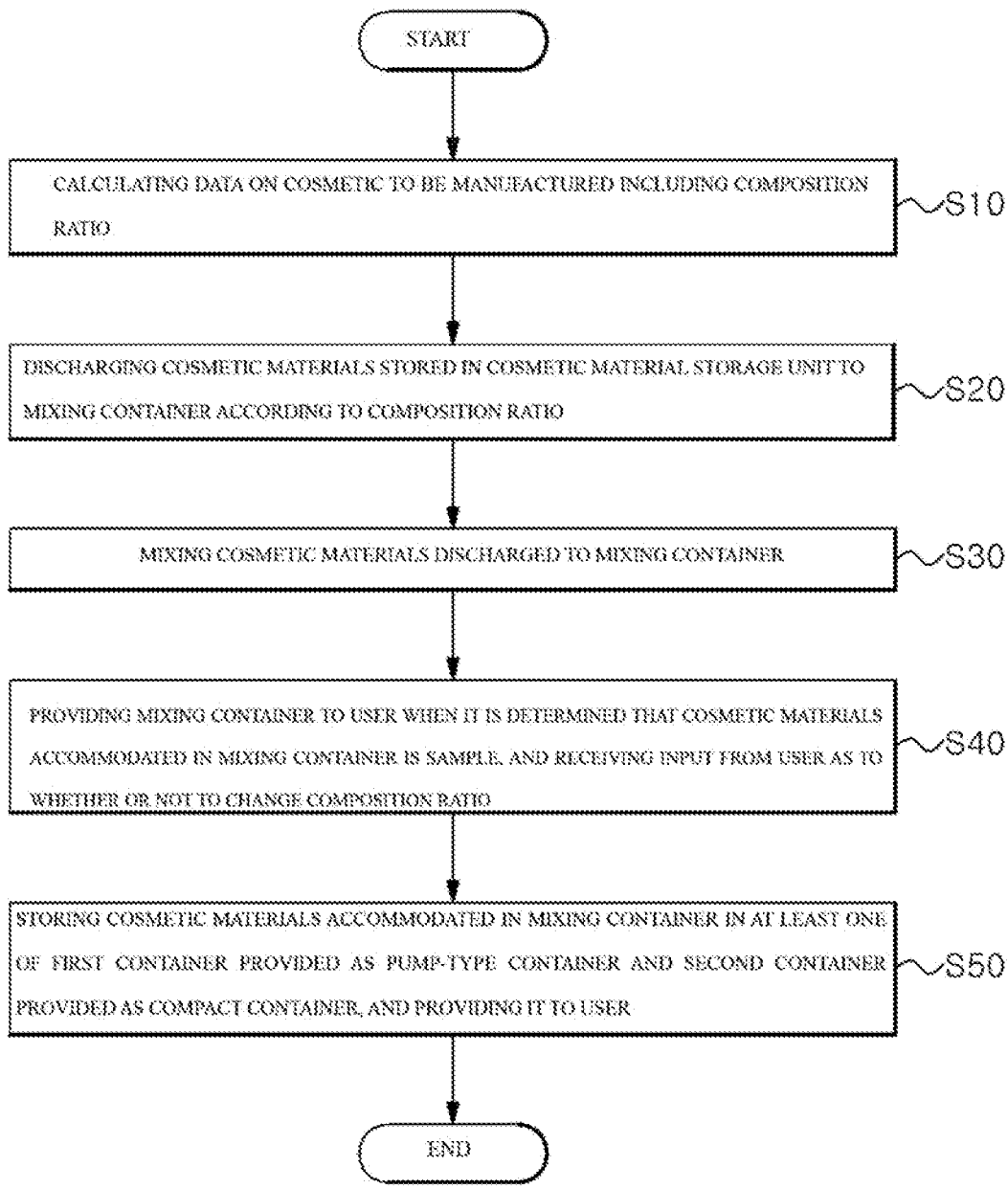
FIG. 11 is a flowchart illustrating a control method of the cosmetic manufacturing apparatus of FIG. 1.

FIG. 11 is a flowchart illustrating a control method of the cosmetic manufacturing apparatus of FIG. 1.

Referring to FIG. 11, the control method of the cosmetic manufacturing apparatus may include calculating data on a cosmetic to be manufactured including the composition ratio by the control unit 900 (S10); discharging the cosmetic materials stored in the cosmetic storage unit 140 to the mixing container 161 according to the composition ratio by controlling the cosmetic material supply unit 200 and the conveying means 800 by the control unit 900 (S20); mixing the cosmetic materials discharged into the mixing container 161 by controlling the mixing unit 400 and the conveying means 800 by the control unit 900 (S30); providing the mixing container 161 to the user when the control unit 900 determines that the cosmetic materials accommodated in the mixing container 161 is a sample, and receiving an input from the user as to whether to change the composition ratio (S40); and storing the cosmetic materials accommodated in the mixing container 161 in at least one of the first container provided as a pump-type container and the second container provided as a compact container and providing it to a user, by controlling the conveying means 800 by the control unit 900 (S50).

The above-described S40 may be optionally provided; S10 may include at least one of S110, S120, S130, S140, and S150 to be described later; S20 may include one of S210 and S220 to be described later; S30 may include at least one of S230 and S240 to be described later; S40 may include at least one of S310, S320, S330, S340, S350, S360, S370, S380, S390, S400, S420, and S430 to be described later; S50 may include at least one of S500 and S900 to be described later; and detailed description thereof will be given later.

Figure 12:
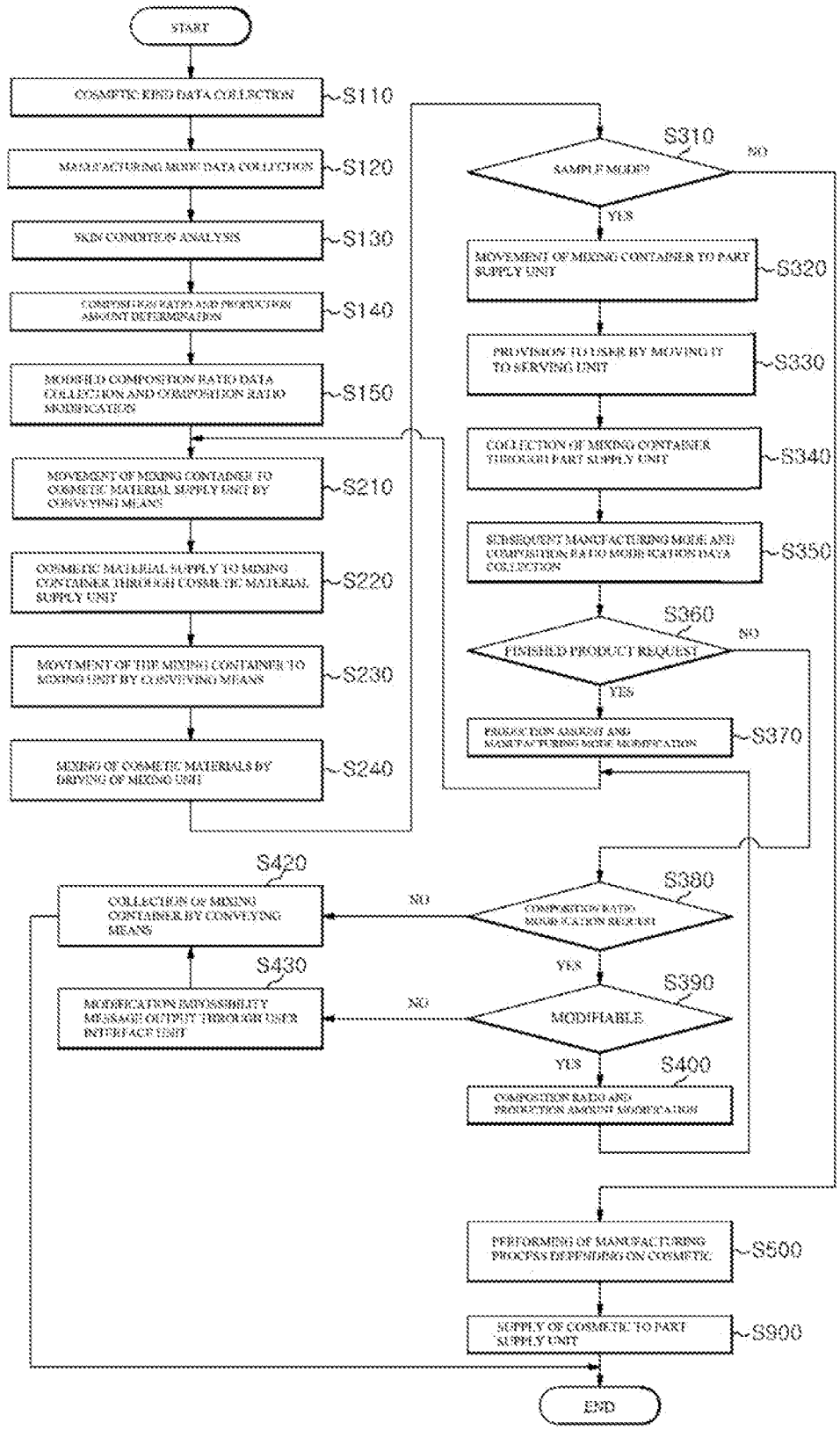
FIG. 12 is a flowchart showing in more detail the control method of the cosmetic manufacturing apparatus of FIG. 1.

FIG. 12 is a flowchart showing in more detail the control method of the cosmetic manufacturing apparatus 10 of FIG. 1.

Referring to FIG. 12, the control unit 900 may collect desired cosmetic kind data from a user through the cosmetic kind receiving unit 940 (S110). The cosmetic kind data may be input through the user interface unit 130 as described above, or may be provided through the terminal 20 and the operating server 40.

Also, the control unit 900 may collect manufacturing mode data as to whether a product desired by the user is a sample or a finished product through the manufacturing mode receiving unit 950 (S120). The manufacturing mode data may be input through the user interface unit 130, or may be provided from the terminal 20 or the operating server 40.

Then, the control unit 900 analyzes the skin condition of the user through the skin condition analysis unit 910 (S130). As described above, the skin condition analysis unit 910 may receive the already analyzed result from any one of the terminal 20 and the operating server 40.

The composition ratio determination unit 920 of the control unit 900 determines the composition ratio data based on the analysis result provided in step S130, and determines the amount to be manufactured as a cosmetic according to the manufacturing mode collected in step S120 (S140). In this step, the supply amounts of a plurality of kinds of cosmetics stored in the cosmetic storage unit 140 may be determined. For example, when the user selects the sample manufacturing mode, supply amounts of the cosmetic materials required to produce a relatively small amount of the cosmetic may be determined. In addition, when the user selects the finished product manufacturing mode, as a relatively large amount, a set amount to be provided as one product for sale may be set as the total amount of the cosmetic, and the supply amount of each cosmetic material for this may be determined. In this embodiment, the composition ratio determination unit 920 may determine a result closest to the skin condition analysis result among a plurality of preset composition ratios, as composition ratio data.

Further, S140 may include determining the composition ratio data by the composition ratio determination unit 920 under the consideration of the user's cosmetic purchase history. For example, if the user has a lot of history of purchasing cosmetics with a brighter color than the skin condition measured by the terminal 10, the composition ratio determination unit 920 may determine the composition ratio data to represent a brighter color than the composition ratio data based on the skin condition analysis result.

And, after the composition ratio modification unit 930 of the control unit 900 presents the composition ratio data (at least one of a composition ratio based on a skin condition analysis result and a composition ratio under the consideration of a cosmetic purchase history) to the user through the user interface unit 130, or the like, it may collect the composition ratio modification data from the user, and modify the composition ratio data and the supply amount of each cosmetic material according to the result (S150).

In step S150, the user may select not to modify the composition ratio through the user interface unit 130 or the terminal 20, and in this case, the composition ratio data determined in step S140 may be maintained as it is.

S110 to S150 described above are steps of collecting information necessary for cosmetic manufacturing and generating data, and their order can be interchanged, and each step can be divided into more subdivided steps so that it can be transformed to interact with the user or process data.

After the collection of information and data processing necessary for cosmetic manufacturing have been completed, the physical cosmetic manufacturing step is performed.

The control unit 900 may control the robot arm control unit 820 to drive the conveying means 800. As described above, the conveying means 800 may be constituted by the first conveying unit 801 and the second conveying unit 802, and in each step to be described later, any one or both of the first conveying unit 801 and the second conveying unit 802 may be used as the conveying means 800 in the cosmetic manufacturing process.

Specifically, the control unit 900 may control the conveying means 800 to move the mixing container 161 toward the cosmetic material supply unit 200 (S210).

At this time, if the mixing container 161 is moved toward the cosmetic material supply unit 200 disposed on one side (the left side of FIG. 4), the mixing container 161 in the part supply unit 160 can be moved directly to the cosmetic material supply unit 200, while, if the mixing container 161 is moved to the cosmetic material supply unit 200 disposed on the other side (the right side of FIG. 4), the mixing container 161 in the part supply unit 160 may be moved to the cosmetic material supply unit 200 after being seated on the mounting unit 300.

Here, the movement of the mixing container 161 toward the cosmetic material supply unit 200 may be understood as moving to the seat groove 2547*a* for a mixing container of the mixing container conveying unit 250.

Meanwhile, when S210 is performed a second time, that is, when it is preformed after the mixing container 161 has been provided to the user as a sample manufacturing mode and recovered, the control unit 900 may directly move the mixing container 161 in the part supply unit 160 to the cosmetic material supply unit 200 with the conveying means 800, or move the mixing container 161 in the part supply unit 160 to the seat portion 300, and move from the seat portion 300 back to the cosmetic material supply unit 200.

In this way, the specific control method varies depending on the number of times in which S210 is performed, and the mixing container 161 provided as a sample to the user is also used in subsequent procedures, thereby preventing unnecessary process waste and material waste, and thus lowering the production cost of the product.

Thereafter, the cosmetic material supply unit 200 is controlled by the control unit 900 to supply cosmetic materials to the mixing container 161 according to the predetermined composition ratio (S220). The control unit 900 may control such that the cosmetic materials are sequentially discharged from each cartridge 142 through the cosmetic material supply means 220 so as to correspond to the predetermined composition ratio data and the production amount. To this end, the control unit 900 may control the conveying means 800 to move and fix the movable block 254 for a mixing container of the mixing container conveying unit 250. Specifically, the conveying means 800 may selectively constrain the movable block 254 to the stopper 256 for a mixing container by operating the locking lever 255 for a mixing container, and move the movable block for a mixing container in a preset order according to the composition ratio data, thereby allowing the mixing container 161 to be supplied with the cosmetic materials provided from the cosmetic supply means 220. Here, the movement of the mixing container conveying unit 250 disposed on one side may be performed by the second conveying unit 802, and the movement of the mixing container conveying unit 250 disposed on the other side may be performed by the first conveying unit 801.

Meanwhile, in S220, the control unit 900 may adjust the supply speed of the cosmetic material supply means 220 according to the amount of the supplied cosmetic material. For example, in the case of supplying any one cosmetic material stored in any one cartridge 142 to the mixing container 161, when the ratio (B/A) of the already-supplied amount (B) to the total amount (A) to be supplied from the cartridge 142 is lower than the preset range, the cosmetic supply means 220 allows the cosmetic material to be supplied at a relatively high-speed, while, when the ratio is higher than the preset range, it allows the cosmetic material to be supplied at a relatively low-speed. Accordingly, high-speed supply can be achieved in the initial section where fine control is unnecessary, and thus the total cosmetic supply time can be shortened. Here, as a method of measuring the already-supplied amount (B), a method in which the control unit 900 calculates the supply amount according to the recording time and speed at which the cosmetic supply means 220 has been driven may be used, or a method in which it is calculated by receiving the changed weight data from the weight sensor provided in the movable block 254 for a mixing container may be used.

The mixing container 161 for which the cosmetic material injection has been finished in the cosmetic material supply unit 200 may be moved to the mixing unit 400 by the conveying means 800 (S230).

Here, after the cosmetic material injection to the mixing container 161 has been finished in the cosmetic material supply unit 200 disposed on one side, the mixing container 161 may be moved from the cosmetic material supply unit 200 to the mixing unit 400 by the second conveying unit 802. Additionally, after the cosmetic material injection to the mixing container 161 has been finished in the cosmetic material supply unit 200 disposed on the other side, the mixing container 161 may be seated on the seat portion 300 by the first conveying unit 801 and then moved from the seat portion 300 to the mixing unit 400 by the second conveying unit 802.

The control unit 900 drives (e.g., rotates) the mixing unit 400 to mix the cosmetic materials accommodated in the mixing container 161, applying an external force to the mixing container 161 (S240). As described above, the mixing unit 400 may rotate the mixing container 161 on its axis while at same time it revolves at a high speed, and the cosmetic materials inside the mixing container 161 can be well mixed by the vortex generated thereby. At this time, after the rotation of the mixing unit 400 stops, the first rotating member 402 of the mixing unit 400 into which the mixing container 161 is inserted may be controlled to stop at the same position by the control unit 900. In this case, the conveying means 800 can insert the mixing container 161 into the first rotating member 402 stopped at a preset position, and thus there is an advantage in that the control for inserting the mixing container 161 into the first rotating member 402 can be simplified.

S210 to S240 described above may be understood as steps of supplying the cosmetic material to the mixing container 161 and mixing a plurality of cosmetic materials accommodated in the mixing container 161.

When S240 has been completed, the control unit 900 determines whether the manufacturing mode collected in step S120 is the sample manufacturing mode or the finished product manufacturing mode (S310).

If the finished product manufacturing mode is selected instead of the sample manufacturing mode, the process of manufacturing a cosmetic may be performed according to the kind of cosmetic (S500). Specific details of S500 will be described later.

The control unit 900 may control the conveying means 800 to present the finished cosmetic container (first container or second container), which has been manufactured at S500 and delivered to the groove 167 of the part supply unit 160, to the user (S900). Specifically, the control unit 900 may control the second conveying unit 802 to place the completed cosmetic container (the first container or the second container) in the groove 167 of the part supply unit 160. At this time, the user may open the part supply door 129 and take out the completed cosmetic container placed on the part supply unit 160. Alternatively, the second conveying unit 802 may push the tray 165 of the part supply unit 160, so that the completed cosmetic container placed on the part supply unit 160 can be discharged to the outside of the main body 100.

Meanwhile, as a result of the determination in S310, in the case of the sample manufacturing mode, the control unit 900 may move the mixing container 161 of the mixing unit 400 to the groove 167 of the part supply unit 160 or the mixing container support unit 163a by the conveying means 800 in order for the user to try the mixed cosmetic materials accommodated in the mixing container 161 as a sample (S320). In this case, the second conveying unit 802 may be used as the conveying means 800. According to an embodiment, the control unit 900 may control the conveying means 800 to move the mixing container 161 from the seat portion 300 to the part supply unit 160 after moving the mixing container 161 of the mixing unit 400 to the seat portion 300.

The control unit 900 may control the conveying means 800 to supply the mixing container 161 delivered to the part supply unit 160 to the user (S330). S330 may be understood as being substantially the same as S900 described above.

Since the user has selected the sample manufacturing mode, the user may receive and try the mixing container 161 provided as a sample, and then put it back on the part supply unit 160, specifically, the groove 167 of the part supply unit 160, or the mixing container support unit 163a.

At this time, at least one of the tray 165 or the groove 167 or the mixing container support 163a is provided with a predetermined detection means such as a weight sensor, so that it can be detected whether the user has returned the mixing container 161 of the sample cosmetic. Alternatively, the cosmetic manufacturing apparatus 10 may receive an input from the user through the user interface unit 130 as to whether the mixing container 161 is returned to the part supply unit 160 after the sample cosmetic has been used. Alternatively, the control unit 900 may induce the user to return the mixing container 161 to the part supply unit 160 by notifying the user through the user interface unit 130 that the part supply unit 160 is automatically recovered after a preset period of time has elapsed.

The control unit 900 may move the tray 165 of the part supply unit 160 back to the inside of the main body 100 by using the conveying means 800, thereby recovering the mixing container 161 again (S340).

In addition, the control unit 900 may collect subsequent manufacturing mode data and, if necessary, composition ratio modification data from the user through the manufacturing mode receiving unit 950 (S350). The subsequent manufacturing mode may be collected through the user interface unit 130 and the like, similarly to the manufacturing mode in step S120 described above, and may be one of the finished product manufacturing request, the composition ratio modification request, and the discard request. In this case, when the subsequent manufacturing mode selected by the user is a composition ratio modification request, the control unit 900 may additionally collect composition ratio modification data through the composition ratio modification unit 930.

If the subsequent manufacturing mode collected in S350 is the finished product manufacturing request (S360), the control unit 900 may change the data of the total amount of the cosmetic to be manufactured to correspond to the manufacturing of the finished product, and may change the manufacturing mode from the sample manufacturing mode to the finished product manufacturing mode (S370). In this case, the manufacturing amount data of the cosmetic to be additionally manufactured may be set as an amount obtained by subtracting the amount provided as a sample from the total amount. According to an embodiment, the control unit 900 may set the manufacturing amount of cosmetic to be additionally manufactured under the consideration of the difference between the initial weight provided as a sample and the returned weight.

Then, the control unit 900 may re-perform S210 and process after it. Therefore, additional cosmetic material supply for manufacturing the finished product is performed according to the preset composition ratio, and the data is changed to the finished product manufacturing mode, so that the process after S500 may be performed according to the determination result in S310.

Meanwhile, as a result of the determination in step S360, if it is not a request for manufacturing a finished product, the control unit 900 determines whether or not the user's request is a request for modifying the composition ratio (S380). In this flowchart, S360 and S380 are illustrated by way of example as being sequentially performed, but in an actual control program, these may be processed as a single branch logic.

As a result of the determination in S380, if it is not a request to modify the composition ratio, it may be treated as a request for discard of the manufactured sample, and the control unit 900 may control the conveying means 800 to move the mixing container 161 in which the mixed cosmetic is stored from the part supply unit 160 to the recovery portion 112 (S420). In this case, the second conveying unit 802 may be used as the conveying means 800.

As a result of the determination in step S380, if there is a request for modification of the composition ratio, the control unit 900 determines whether or not such composition ratio modification is possible (S390). A user's request for modification may be made in various ways, and in some cases, there may be a case in which modification is impossible with the already-manufactured cosmetic in the mixing container 161. For example, if cosmetic material of a specific ingredient should be excluded or if a specific cosmetic material has been added more than the amount that should be included in the finished product, it is impossible to respond by supplying additional cosmetic materials to the mixing container 161 in which the already-manufactured cosmetic materials are stored. In this case, the control unit 900 may output a message that the composition ratio cannot be modified to the user through the user interface unit 130 (S430), and recover the mixing container 161, that is, the sample manufactured by performing S420.

On the other hand, if it is determined in S390 that the composition ratio can be modified, the control unit 900 determines composition ratio data and production amount for manufacturing a new sample according to the composition ratio requested to be modified (S400). This may be performed substantially in the same way as S150, but an additional input amount of each cosmetic material may be calculated under the consideration of the amount of the cosmetic material that has already been put into the mixing container 161.

Then, the control unit 900 may re-perform S210 and process after it. Thereby, additional cosmetic material supply for manufacturing other sample is made according to the changed composition ratio data and production amount, and since it is still in the sample manufacturing mode, the process after S320 may be performed according to the determination result in step S310.

According to an embodiment, the number of requests for modification of the sample may be limited, and the control unit 900 may notify the limited number of times through the user interface unit 130 before and after performing S350 and S370, or inform that a request for further modification of the sample is impossible.

S310 to S430 described above may be understood as providing sample cosmetics to the user.

Through the above-described process, the user may receive and test a sample of the cosmetic that he or she wants to manufacture or a customized cosmetic suitable for his or her skin condition, or change it and test it again, and manufacture the finished product immediately or after sample testing. Therefore, the cosmetic manufacturing apparatus 10 can provide improved satisfaction to the user.

Hereinafter, with reference to the drawings, the manufacturing process according to the cosmetic kind (e.g., whether the first container or the second container) performed as S500 will be described in detail.

Figure 13:
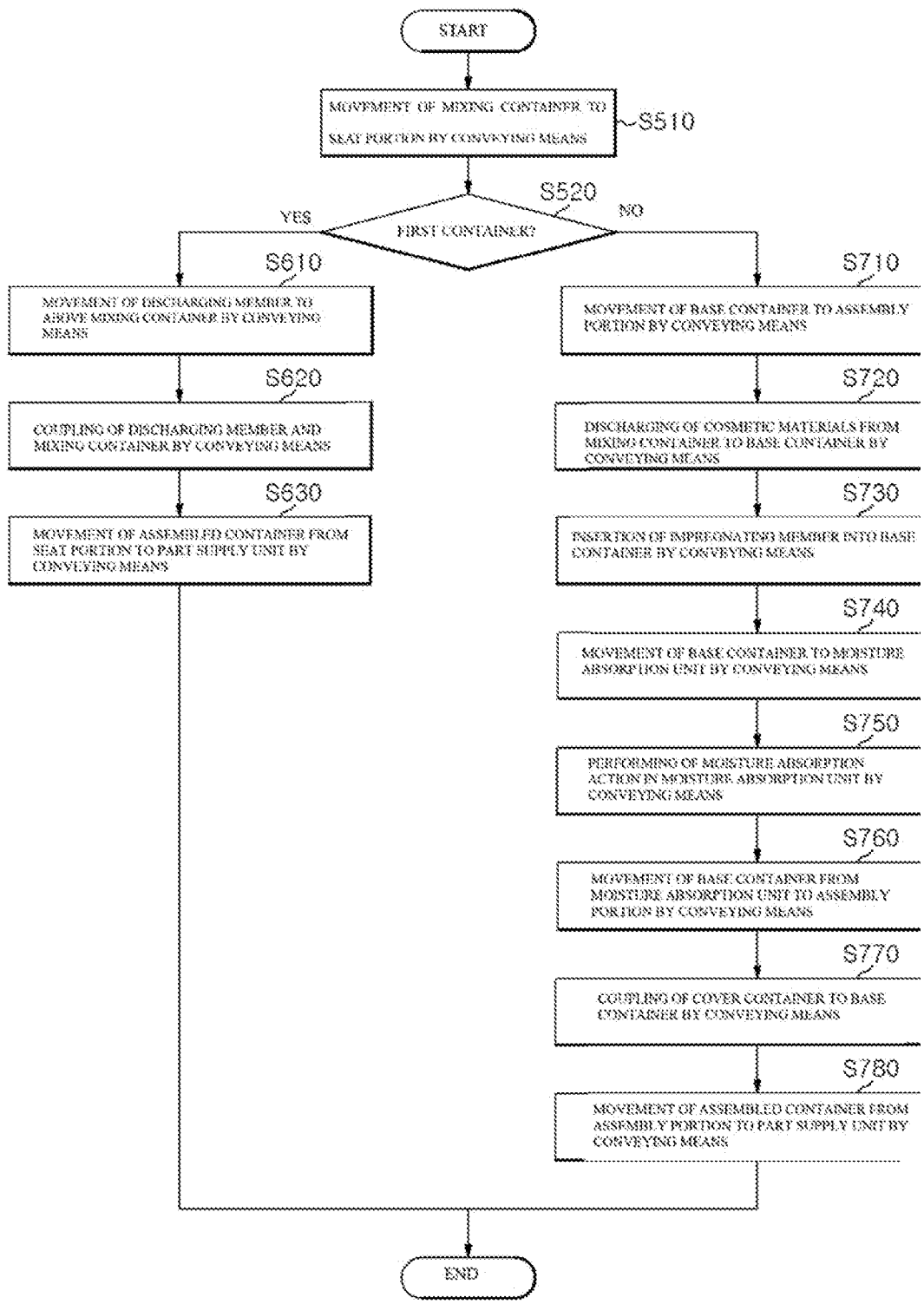
FIG. 13 is a flowchart showing specific processes of a manufacturing step according to the kind of cosmetic of FIG. 12.

FIG. 13 is a flowchart showing specific processes of a manufacturing step according to the kind of cosmetic of FIG. 12.

Referring to FIG. 13, as S500, the control unit 900 may move the mixing container 161 from the mixing unit 400 with the conveying means 800 to the part holding unit 50 (specifically, the seat portion 300), and the mixing container 161 seated on the seat portion 300 may wait for a subsequent process (S510).

When the kind of cosmetic collected in S110 is the first container (S520), the control unit 900 may control the conveying means 800 to move the discharging member 162 provided in the part supply unit 160 to the upper part of the mixing container 161 seated on the seat portion 300 (S610). This process may be performed by the second conveying unit 802, and the second conveying unit 802 may maintain the state of continuously gripping the discharging member 162 after moving the discharging member 162 to the predetermined position. Here, the kind of cosmetic may be transmitted to the control unit 900 from the user interface unit 130 or the terminal 20.

Thereafter, the control unit 900 controls the conveying means 800 to couple the discharging member 162 to the mixing container 161 on the seat portion 300 (S620). The mixing container 161 and the discharging member 162 may be coupled to each other by screw coupling, that is, the mixing container 161 is fixed to the mixing container seat groove 302 of the seat portion 300, so that he conveying means 800 may achieve screw coupling by rotating the discharging member 162 after fitting the discharging member 162 to the upper end of the mixing container 161.

In this case, the discharging member 162 may include a straw 1622, a pumping part 1621, and a cap 1623, and the straw 1622 needs to enter the interior of the mixing container 161 before the screw coupling of the cap 1623 and the mixing container 161. However, since the straw 1622 is formed of a soft material and its shape or orientation is not constant, the first conveying unit 801 may support the straw 1622 in the coupling process, so that the straw can smoothly enter the inlet of the mixing container 161. Specifically, the second conveying unit 802 grips the cap 1623, and the first conveying unit 801 may be moved up and down while being in contact with the straw 1622, so that the straw 1622 can be aligned with an inlet portion 1611 of the mixing container 161 in the seating portion 300.

By completing the coupling of the mixing container 161 and the discharging member 162, the first container may be provided as a finished product, and the control unit 900 may control the conveying means 800 to move the assembled container on the seat portion 300 to the part supply unit 160 (S630). This may be performed by the second conveying unit 802. Such processes S610 to S630 may be understood as an assembly process of the first container.

Meanwhile, in S520, when it is determined that the kind of cosmetic to be manufactured is the second container, the control unit 900 controls the conveying means 800 to move the base container 164 in the part supply unit 160 to the assembly portion 500 (S710). This process may be performed by the second conveying unit 802.

And the control unit 900 may control the conveying means 800 to take the mixing container 161 from the seat portion 300, pour and discharge the mixed cosmetic materials into the interior of the base container 164 (S720). Discharging the cosmetic materials from the mixing container 161 may use a method in which they naturally fall by gravity by turning over the mixing container 161, and to this end, the conveying means 800 may perform an operation of tilting the mixing container 161 to a predetermined angle. In this case, the cosmetic materials inside the mixing container 161 may not be completely discharged, and thus the conveying means 800 may further perform a shaking operation after a predetermined period of time has elapsed after rotating the mixing container 161 at a preset angle, so that even a little more cosmetic material can be discharged due to inertia. Such process may be performed by the second conveying unit 802. For example, the mixing container 161 may rotate 150 degrees to 180 degrees, and when the mixing container 161 rotates 180 degrees, it may be understood as the inlet portion 1611 of the mixing container 161 facing the floor.

The control unit 900 may further control the conveying means 800 that has performed S720 to move the mixing container 161 which has discharged the cosmetic materials, to the recovery portion 112 to recover it.

And, the control unit 900 may control the conveying means 800 to grip the impregnating member 168 from the part supply unit 160 and insert it into the base container 164 in which the cosmetic materials are accommodated (S730). This process may be performed by the second conveying unit 802.

Thereafter, the control unit 900 may move the base container 164 in which the impregnating member 168 is accommodated to the moisture absorption unit 600 by the conveying means 800 (S740). This process may be performed by the first conveying unit 801.

In the moisture absorption unit 600, the base container 164 may be moved to a position corresponding to the moisture absorption tool 620 through the base container conveying unit 650, and a moisture absorption process may be performed by the moisture absorption tool 620 (S750). The control unit 900 may control the conveying means 800 for the movement of the base container 164 and the operation of the moisture absorption tool 620, and specifically, the operation of moving the base container 164 by operating the base container conveying unit 650 may be performed by the first conveying unit 801, while providing a pressing force for moisture absorption through the moisture absorption tool 620 may be performed by the second conveying unit 802. That is, the moisture absorption process may be achieved by cooperation of the first conveying unit 801 and the second conveying unit 802. The moving structure of the base container conveying unit 650 may include a guide rail, a movable block, a locking lever, a stopper, and the like, similarly to the above-described mixing container conveying unit 250, and may operate substantially in the same manner. However, the movable block of the base container conveying unit 650 may further include a structure for operating in linkage with the moisture absorption tool 620. By this process, the cosmetic materials accommodated in the base container 164 may be sufficiently impregnated in the impregnating member 168.

When all the moisture absorption process in S750 is completed, the control unit 900 may control the conveying means 800 to move the base container 164 from the moisture absorption unit 600 to the assembly portion 500 again (S760). This process may be performed by the first conveying unit 801.

And, the control unit 900 may control the conveying means 800 to take out the cover container 166 from the part supply unit 160 and couple it to the base container 164 on the assembly portion 500 (S770). This process may also be performed by the first conveying unit 801.

By completing the coupling of the base container 164 and the cover container 166, the second container is completed as a finished product, and the control unit 900 may control the conveying means 800 to move the assembled container on the assembly portion 500 to the part supply unit 160 (S780). This may be performed by the second conveying unit 802. Such processes S710 to S780 may be understood as an assembly process of the second container.

Through the above process, the cosmetic manufacturing apparatus 10 and the control method of the cosmetic manufacturing apparatus 10 can provide the first container as a pump-type container or the second container as a compact container depending on the user's selection. However, the spirit of this disclosure is not limited thereto, and according to an embodiment, the cosmetic manufacturing apparatus 10 may be implemented and operated as providing only one cosmetic container among the first container and the second container. In this case, the components and the control method used for manufacturing the other kind of cosmetic in the above description may be omitted.

Figure 14:
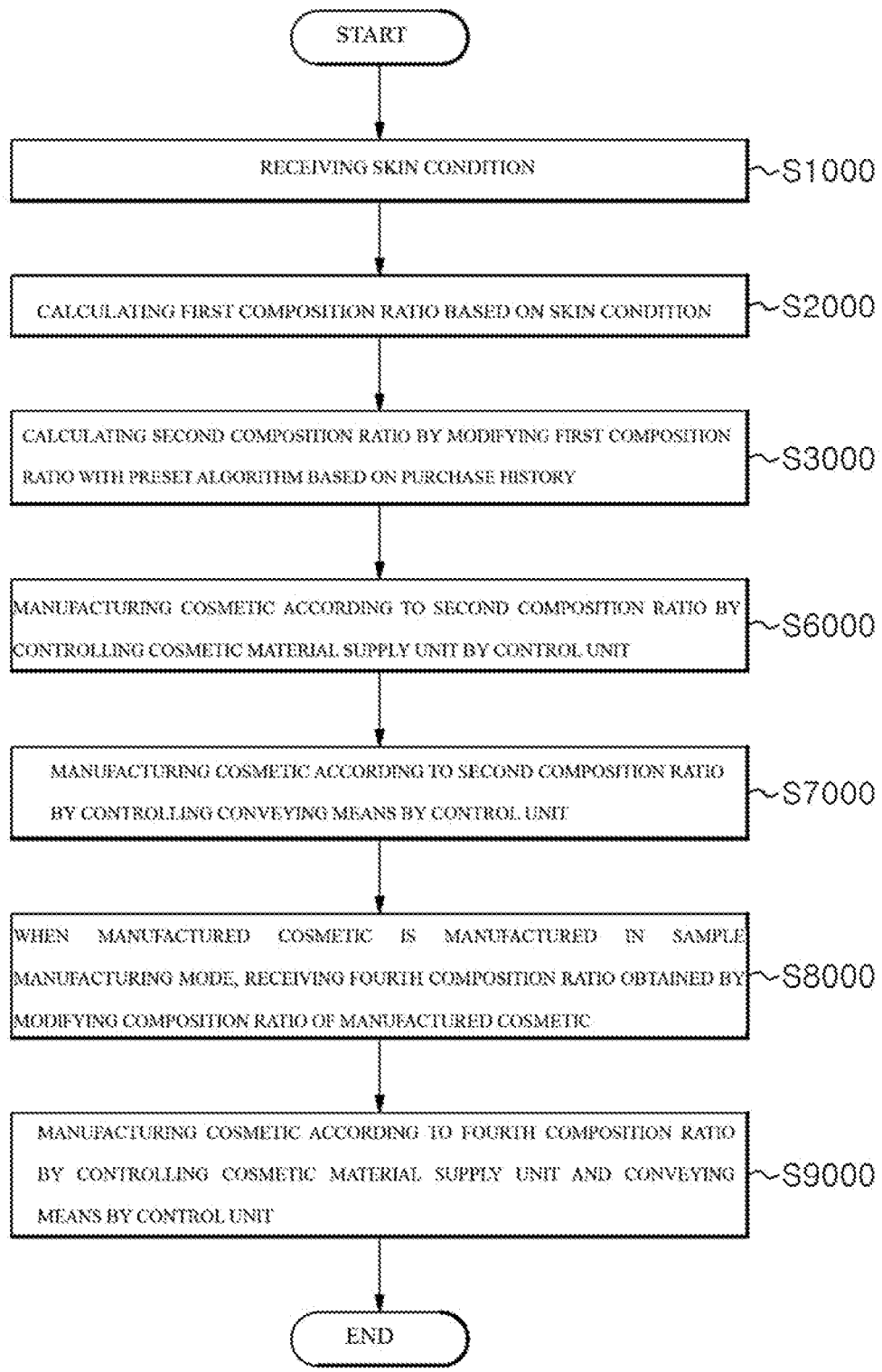
FIG. 14 is a flowchart illustrating a control method of a cosmetic manufacturing apparatus according to an embodiment of this disclosure.

FIG. 14 is a flowchart illustrating a control method of a cosmetic manufacturing apparatus according to an embodiment of this disclosure.

The control method of a cosmetic manufacturing apparatus according to an embodiment of this disclosure may include: receiving, by the control unit 900, skin condition measured by a measurement sensor (S1000); calculating a first composition ratio based on the received skin condition (S2000); receiving the cosmetic purchase history of the user from the operating server 40, and calculating a second composition ratio by modifying the first composition ratio with a preset algorithm based on the purchase history (S3000); discharging cosmetic materials according to the second composition ratio by controlling the cosmetic material supply unit 200 by the control unit 900 (S6000).

Further, after step S6000, the control method may further includes manufacturing a cosmetic according to the second composition ratio by controlling the conveying means 800 by the control unit 900 (S7000); when the manufactured cosmetic is manufactured in the sample manufacturing mode, receiving a fourth composition ratio obtained by modifying the composition ratio of the manufactured cosmetic (S8000); and manufacturing a cosmetic according to the fourth composition ratio by controlling the conveying means 800 by the control unit 900 (S9000).

First, the step of receiving, by the control unit 900, skin condition measured by a measurement sensor (S1000) will be described in detail as follows.

The measurement sensor (not shown) may be provided as a part of the terminal 20, or as a device separate from the terminal 20.

For example, the measurement sensor may be a known skin condition measurement means, such as a camera, a moisture sensor, an oil sensor, and a color difference meter, and this measurement sensor may be provided as a part of the terminal 20, or as a device separate from the terminal 20.

In this embodiment, it will be described by way of example that the measurement sensor include a color difference meter capable of displaying skin measurement values as L, a, and b, and an oil and moisture sensor capable of measuring oil and moisture. Here, the L, a, and b information measured by the color difference meter may be used when determining the composition ratio of a foundation product, and the information on oil and moisture measured by the oil and moisture sensor may be used to determine the composition ratio of a skin care product.

However, it should be noted that the spirit of this disclosure is not limited thereto, and all the L, a, and b information measured by a color difference meter and the information on oil and moisture measured by an oil and moisture sensor may be used when the composition ratio of a foundation product or the composition ratio of a skin care products are determined.

The measurement sensor may measure the skin condition of a user and transmit at least one of L, a, and b values, oil value, and moisture value of the skin, which are the measured values, to the control unit 900 of the cosmetic manufacturing apparatus 10. Here, L may be understood as indicating brightness in the CIE L*a*b* color space; a may be understood as indicating which side between red and green it is biased to; and b may be understood as indicating which side between yellow and blue it is biased to.

Although, in this embodiment, it is described by way of example that the composition ratio (first composition ratio, second composition ratio, fourth composition ratio) to be described later is calculated by the control unit 900 of the cosmetic manufacturing apparatus 10, the spirit of this disclosure is not limited thereto, and may include calculating the composition ratio in the terminal 20 and/or the operating server 40. Next, the step of calculating, by the control unit 900, a first composition ratio based on the received skin condition (S2000) will be described in detail as follows.

The first composition ratio may be determined by inputting the skin measurement values measured by the measurement sensor as a variable into a preset calculation formula, or a composition ratio corresponding to the preset values in the product database which have the smallest difference between themselves and the skin measurement values measured by the measurement sensor may be determined as the first composition ratio.

The cosmetic manufacturing apparatus 10 may include a product database and a customer database, and the product database may store composition ratios of cosmetic material components corresponding to L, a, and b values.

FIG. 15 shows an example of composition ratios of cosmetic material components corresponding to L, a, and b set values stored in the product database.

The L, a, b set values and cosmetic material composition ratios shown in FIG. 15 are merely examples, and the L, a, b values and cosmetic material composition ratios are not limited to the L, a, b values and cosmetic material composition ratios shown in FIG. 15.

In this embodiment, it will be described by way of example that the first composition ratio is determined to be a composition ratio corresponding to the preset values preset in the product database which have the smallest difference between themselves and the skin measurement values measured by the measurement sensor.

Specifically, when the skin measurement values measured by the measurement sensor are L2, a2, and b2, and the values stored in the product database are L1, a1, and b1, a composition ratio corresponding to the values stored in the product database having the smallest value of $\sqrt{(L1-L2)^2+(a1-a2)^2+(b1-b2)^2}$ may be set as the first composition ratio. (For example, referring to FIG. 15, when the skin measurement values are 90, 40, or 40, the composition ratio for cosmetic material components A:B:C:D may be determined as 1:1:0.9:0.7.)

Here, 500 to 100,000, preferably, 900 to 50,000 composition ratios may be stored in the product database.

Meanwhile, the cosmetic manufacturing apparatus 10 may further include a customer database, and the customer database may store the above-described user context information.

Next, the step of receiving the cosmetic purchase history of the user from the operating server 40, and calculating a second composition ratio by modifying the first composition ratio with a preset algorithm based on the purchase history (S3000) will be described in detail as follows.

When the user has a lot of histories of purchasing cosmetics of a color brighter than that of the cosmetic having the first composition ratio, S3000 may be understood as recommending to a user a second composition ratio representing a color brighter than that of the first composition ratio. (Contrarily, when the user has a lot of histories of purchasing cosmetics of a color darker than that of the cosmetic having the first composition ratio, it may include recommending to a user a second composition ratio representing a color darker than that of the first composition ratio.)

For example, a user may have purchase histories of purchasing cosmetics having a composition ratio of X2:Y2:Z2:K2 for an arbitrary cosmetic materials, and the above-described first composition ratio may be a composition ratio X1:Y1:Z1:K1 for the arbitrary cosmetic materials.

In this case, the second composition ratio may be set to a composition ratio $(P*X1+X2)/(P+1):(P*Y1+Y2)/(P+1):(P*Z1+Z2)/(P+1):(P*K1+K2)/(P+1)$ for the arbitrary cosmetic materials. Here, P may denote a weight, and the weight may be input by the user from the user interface unit 130 or the terminal 20. P may be a natural number between 1 and 10. For example, if the user assigns a weight of 2 to the purchase history, the second composition ratio may be set to $(2*X1+X2)/3:(2*Y1+Y2)/3:(2*Z1+Z2)/3:(2*K1+K2)/3$. Here, * may be defined as a multiplication operation sign.

Additionally, when the user purchases cosmetics multiple times, the composition ratios X2:Y2:Z2:K2 for the arbitrary cosmetic materials may be an average of the composition ratios of the cosmetics purchased multiple times.

Also, the user may have a purchase history of a cosmetic that may indicate L3, a3, and b3.

In this case, the skin measurement values measured by the measurement sensor may be modified to measurement modification values, $(P*L3+L2)/(P+1)$, $(P*a3+a2)/(P+1)$, and $(P*b3+b2)/(P+1)$. In this case, the second composition ratio may be determined to be the composition ratio corresponding to the preset values preset in the product database having the smallest difference between themselves and the measurement modification values. Here, P may denote a weight, and the weight may be input by the user from the user interface unit 130 or the terminal 20, and be a natural number between 1 and 10.

Here, the operating server 40 may store the user's cosmetic purchase information and the user context described above.

Further, although, in this embodiment, it is described by way of example that the calculation process of the above-described first composition ratio and second composition ratio is performed by the cosmetic manufacturing apparatus 10, the spirit of this disclosure is not limited thereto, and after the first composition ratio and the second composition ratio are calculated by the operating server 40, it may be transmitted to the cosmetic manufacturing apparatus 10, or displayed on the terminal 20 or the user interface unit 130. In addition, the operating server 40 may also include the above-described customer database and product database.

The above-described S1000, S2000, and S3000 may be understood as a detailed description of S10 of calculating data for cosmetics to be manufactured including the composition ratio by the control unit 900 as described above in FIG. 11.

Next, the step of discharging cosmetic materials according to the second composition ratio by controlling the cosmetic material supply unit 200 by the control unit 900 (S6000) will be described in detail as follows.

A plurality of cartridges 142 may store a plurality of cosmetic materials in the cosmetic storage unit 140, and the control unit 900 may control the cosmetic material supply unit 200 to control at least one of a composition ratio, discharge amount, and discharge rate at which the cosmetic materials stored in the cartridges 142 are discharged.

The cosmetic material discharged by the cosmetic material supply unit 200 may be accommodated in the mixing container 161 by the movement of the movable block 254 for a mixing container as described above.

After step S6000, the step of manufacturing a cosmetic according to the second composition ratio by controlling the conveying means 800 by the control unit 900 (S7000) may be performed.

Specifically, by controlling the conveying means 800 by the control unit 900, the mixing container 161 in which the cosmetic materials are stored according to the second composition ratio may be seated on the part holding unit 50.

After S7000, the step of when the manufactured cosmetic is manufactured in the sample manufacturing mode, receiving a fourth composition ratio obtained by modifying the composition ratio of the manufactured cosmetic (S8000) may be performed.

Whether a cosmetic is of the sample manufacturing mode or of the finished product manufacturing mode may be input from the user interface unit 130 or the terminal 20, and may be input before or after S1000.

Here, the user interface unit 130 may include an input unit (not shown) for selecting whether a cosmetic to be manufactured is of the sample manufacturing mode in which the cosmetic to be manufactured is provided as a sample, or of the finished product manufacturing mode in which the cosmetic to be manufactured is provided as a finished product.

To describe S8000 in more detail, the cosmetic manufactured according to the above-described second composition ratio may be stored in the mixing container 161 and delivered to the user through the part supply unit 160, and the user may try the cosmetic (sample) manufactured according to the second composition ratio.

At this time, after the user has tried the cosmetic manufactured according to the second composition ratio, the user may judge whether it is suitable for him or her, and request to manufacture the finished product, or to modify the composition ratio. When the user wants to request the modification of the composition ratio, he or she may input the fourth composition ratio, which is a modified second composition ratio, to the user interface unit 130 or the terminal 20 so as to transmit it to the control unit 900.

In addition, S8000 may collect subsequent manufacturing mode data from the user. Specifically, the user may input one of the finished product manufacturing request, the composition ratio modification request, and the discard request through the user interface unit 130 or the terminal 20. When the manufactured cosmetic is of the finished product manufacturing mode, the finished product may be manufactured without the step of receiving the fourth composition ratio.

Step S8000 may include S310 to S400 described above with reference to FIG. 12, and detailed description thereof will refer to S310 to S400 described above.

After step 8000, the control unit 900 may control the conveying means 800 to manufacture a cosmetic according to the fourth composition ratio (S9000), so that cosmetics according to the fourth composition ratio can be manufactured. Here, the fourth composition ratio may be understood as the composition ratio modification data described above.

S9000 may include S500 described above with reference to FIGS. 12 and 13, and the detailed description thereof refers to S500 described above.

Figure 16:
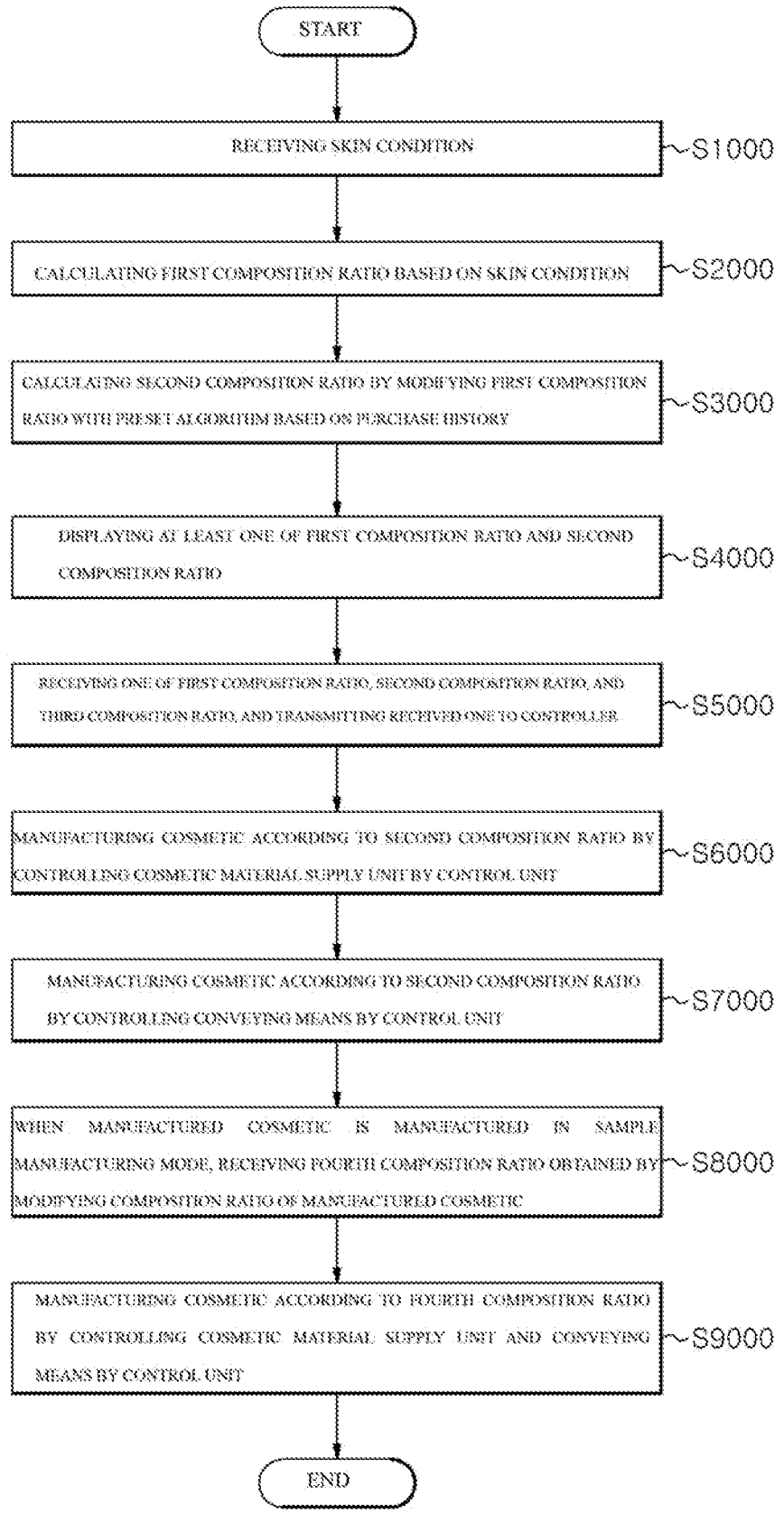
FIG. 16 is a flowchart illustrating a control method of a cosmetic manufacturing apparatus according to another embodiment of this disclosure.

FIG. 16 is a flowchart illustrating a control method of a cosmetic manufacturing apparatus according to another embodiment of this disclosure.

Compared with the control method of a cosmetic manufacturing apparatus of FIG. 14, FIG. 16 has a major difference in that it includes, between steps S3000 and S7000, displaying at least one of the first composition ratio and the second composition ratio on the user interface unit 130 (S4000); receiving one of the first composition ratio, the second composition ratio, and a third composition ratio which is one of modified first and second composition ratios, and transmitting the received one to the control unit 900 (S5000); and discharging cosmetic materials according to received one of the first composition ratio to the third composition ratio by controlling the cosmetic material supply unit 200 by the control unit 900 (S6000), and thus this difference will be mainly described, and the description of the same parts will refer to FIG. 15 described above.

First, the step of displaying at least one of the first composition ratio and the second composition ratio on the user interface unit 130 (S4000) will be described in detail as follows.

The first composition ratio and the second composition ratio may be displayed on one of the user interface unit 130 and the terminal 20, and the user may select one of the first composition ratio, the second composition ratio, and the third composition ratio (a composition ratio obtained by modifying one of the first composition ratio and the second composition ratio) displayed on the user interface unit 130 or the terminal 20.

The displaying of the first composition ratio and the second composition ratio may include displaying not only the numbers indicating the composition ratio itself, but also displaying the color corresponding to that composition ratio.

Next, the step of receiving one of the first composition ratio, the second composition ratio, and a third composition ratio which is one of the first composition ratio and the second composition ratio that modification has been applied to, and transmitting the received one to the control unit 900 (S5000) will be described in detail as follows.

The user may select the first composition ratio or the second composition ratio displayed on the user interface unit 130 or the terminal 20, or selecting and modifying one of the first composition ratio and the second composition ratio displayed on the user interface unit 130 or the terminal 20. In this case, the modified composition ratio may be understood as the third composition ratio, and the modifying of the composition ratio may include not only modifying the composition ratio number itself, but also modifying the color corresponding to the composition ratio.

S5000 may include when the user modifies the first composition ratio or the second composition ratio to the third composition ratio through the user interface unit 130 or the terminal 20, recommending the third composition ratio by reflecting the reason why the user modifies the composition ratio, and selecting the recommended third composition ratio by the user.

Specifically, S5000 may include displaying selection reasons on the user interface 130 or the terminal 20, so that the user can input a reason of selecting one of the first composition ratio and the second composition ratio; receiving the selection reason, calculating the third composition ratio according to a preset algorithm, and displaying the calculated third composition ratio on the user interface unit 130 or the terminal 20 by the control unit 900; and receiving one of the first composition ratio and the second composition ratio and the third composition ratio displayed on the user interface unit 130 or the terminal 20, and transmitting the received one to the control unit 900.

The process of receiving the selection reason and calculating the third composition ratio according to a preset algorithm by the control unit 900 may be exemplified as follows.

For example, when the user selects the second composition ratio (composition ratio obtained by reflecting the purchase history of the user), the following examples may be displayed on the user interface unit 130 or the terminal 20 as possible answers to the selection reason.

To maintain the cosmetic characteristics (color, moisture retention, etc.) used in the past as they are, 2) to maintain about 80% of the cosmetic characteristics (color, moisture retention, etc.) used in the past, but to use a cosmetic that is suitable for the skin condition to some extent, 3) to maintain about 50% of the cosmetic characteristics (color, moisture retention, etc.) used in the past, but to use a cosmetic that is suitable for the skin condition to a certain extent, 4) to maintain about 20% of the cosmetic characteristics (color, moisture retention, etc.) used in the past, but to use a cosmetic that is more suitable for the skin condition, and 5) Other (enter your answer directly)

The control unit 900 may receive one of 1), 2), 3), 4), and 5), take the one into consideration, adjust the weight P for calculating the above-described second composition ratio, calculate the third composition ratio, and display the third composition ratio on the user interface unit 130 or the terminal 20.

For example, when the user selects 3) as an answer to the selection reason, but the initially input weight is 10, the weight for calculating the second composition ratio may be changed to 1, and the third composition ratio in which the weight has been changed to 1 may be derived.

However, the preset algorithm for calculating the above-described third composition ratio is only an example, and this embodiment may include various algorithms as well as this.

Thereafter, one of the input first to third composition ratios may be transmitted to the control unit 900, and the control unit 900 may control the cosmetic material supply unit 200 and the conveying means 800 to manufacture cosmetics according to the third composition ratio.

Additionally, the user interface unit 130 may be provided with an input unit by which one of the first composition ratio and the second composition ratio may be selected, or the third composition ratio may be obtained by modifying one of the first composition ratio and the second composition ratio.

The cosmetics to be manufactured in the above-described FIGS. 14 to 16 may be a foundation having a coverage or a color cosmetic having a color. However, the spirit of this disclosure is not limited thereto, and cosmetics to be manufactured may include skin care products such as skin and lotion.

When the cosmetic to be manufactured is a skin care product, the ratio of oil to moisture may be understood as a composition ratio. In this case, a process of selecting a fragrance suitable for the user's preference may be additionally added, and the fragrance selected by the user may be provided to the finished cosmetic product by the cosmetic material supply unit 200 and the conveying means 800.

Additionally, according to the cosmetic manufacturing system 1 according to an embodiment of this disclosure, information on the skin condition measured by the measurement sensor may be stored in the operating server 40, and customized cosmetics may be produced by receiving a customer order through the terminal 20 capable of communicating with the operating server 40. In this case, the user can remotely order customized cosmetics based on the previously measured data on the skin condition, without the inconvenience of measuring the skin through the measurement sensor whenever ordering.

Specifically, the operating server 40 may store at least one of the above-described first composition ratio, second composition ratio, third composition ratio, and fourth composition ratio, and the user may determine the composition ratio and production amount according to one of the first composition ratio to the fourth composition, and transmit them to the operating server 40 or the cosmetic manufacturing apparatus 10, ratio through the terminal 20.

The following is a list of the above-described embodiments.

Item 1 may provide a cosmetic manufacturing apparatus comprising: a control unit 900 for calculating a first composition ratio based on the user's skin condition measured by a measurement sensor, receiving cosmetic purchase history of the user from an operating server 40, and calculating a second composition ratio by modifying the first composition ratio with a preset algorithm based on the purchase history; and a cosmetic material supply unit 200 which discharges cosmetic materials according to one of the first composition ratio or the second composition ratio, so that a cosmetic is manufactured according to the one of the first composition ratio or the second composition ratio.

Item 2 may provide the cosmetic manufacturing apparatus of item 1, further comprising: a user interface unit 130 which displays at least one of the first composition ratio and the second composition ratio, and receives as an input one of the first composition ratio, the second composition ratio, and a third composition ratio which is one of the first composition ratio and the second composition ratio that modification has been applied to, and wherein the cosmetic material supply unit 200 discharges cosmetic materials according to the received one of the input first composition ratio to the third composition ratio, so that a cosmetic is manufactured according to the received one composition ratio as an input.

Item 3 may provide the cosmetic manufacturing apparatus of items 1 and 2, wherein, by the control unit 900, the first composition ratio is determined by inputting a skin measurement values measured by the measurement sensor as a variable into a preset calculation formula, or a composition ratio corresponding to a preset values in a product database which have the smallest difference between themselves and the skin measurement values measured by the measurement sensor is determined as the first composition ratio.

Item 4 may provide the cosmetic manufacturing apparatus of items 1 to 3, wherein the product database stores L1, a1, and b1 values, and composition ratios corresponding to these values, wherein the skin measurement values are measured as arbitrary values L2, a2, b2 by the measurement sensor, and wherein a composition ratio corresponding to the values stored in the product database having the smallest value of $\sqrt{(L1-L2)^2+(a1-a2)^2+(b1-b2)^2}$ may be set as the first composition ratio.

Item 5 may provide the cosmetic manufacturing apparatus of items 1 to 4, wherein the skin measurement values measured by the measurement sensor are represented by L2, a2, and b2, and when the cosmetic purchase history which are represented as L3, a3, and b3 is received from the operating server 40, by the control unit 900, the skin measurement values are modified to measurement modification values, $(P*L3+L2)/(P+1)$, $(P*a3+a2)/(P+1)$, and $(P*b3+b2)/(P+1)$, and, the second composition ratio is determined to be a composition ratio corresponding to the preset values preset in the product database having the smallest difference between themselves and the measurement modification values.

Item 6 may provide the cosmetic manufacturing apparatus of items 1 to 5, wherein the first composition ratio is represented by a composition ratio X1:Y1:Z1:K1 for arbitrary cosmetic materials, when receiving a purchase history of a cosmetic having composition ratio X2:Y2:Z2:K2 for arbitrary cosmetic materials from the operating server 40, by the control unit 900, the second composition ratio is set to (P*X1+X2)/(P+1):(P*Y1+Y2)/(P+1):(P*Z1+Z2)/(P+1): (P*K1+K2)/(P+1).

Item 7 may provide the cosmetic manufacturing apparatus of items 1 to 6, wherein P is a natural number between 1 and 10 that is input by a user from the user interface unit 130 or the terminal 20.

Item 8 may provide the cosmetic manufacturing apparatus of items 1 to 7, wherein the user interface unit 130 is provided with an input unit for selecting whether a cosmetic to be manufactured is of a sample manufacturing mode in which the cosmetic to be manufactured is provided as a sample, or of a finished product manufacturing mode in which the cosmetic to be manufactured is provided as a finished product.

Item 9 may provide the cosmetic manufacturing apparatus of items 1 to 8, wherein the user interface unit 130 is provided with an Input unit for selecting whether a cosmetic to be manufactured is a foundation product or a skin care product.

Item 10 may provide a cosmetic manufacturing system comprising: a measurement sensor for measuring user's skin condition; an operating server 40 which stores cosmetic purchase history of a user, calculating a first composition ratio based on the skin condition of the user measured by the measurement sensor, and calculating a second composition ratio by modifying the first composition ratio with a preset algorithm based on the purchase history; a terminal 20 for receiving as an input one of the second composition ratio or a third composition ratio which is one of the first composition ratio and the second composition ratio that modification has been applied to; a cosmetic manufacturing apparatus 10 of items 1 to 9 which discharges cosmetic materials according to the received one of the first to third composition ratios, so that a cosmetic is manufactured according to the received one composition ratio.

Item 11 may provide the cosmetic manufacturing system of item 10, wherein by the operating server 40, the first composition ratio is determined by inputting a skin measurement values measured by the measurement sensor as a variable into a preset calculation formula, or a composition ratio corresponding to a preset values in a product database which have the smallest difference between themselves and the skin measurement values measured by the measurement sensor is determined as the first composition ratio.

Item 2 may provide a cosmetic manufacturing system, comprising: an operating server 40 which stores one of a first composition ratio calculated based on the user's skin condition measured by the measurement sensor and a second composition ratio obtained by modifying the first composition ratio with a preset algorithm; a terminal 20 for receiving and displaying at least one of the first composition ratio and the second composition ratio from the operating server 40; and a cosmetic manufacturing apparatus 10 of items 1 to 11 which receives as an input one of the first composition ratio, the second composition ratio, and a third composition ratio which is one of the first composition ratio and the second composition ratio that modification has been applied to, from the terminal 20, and manufactures a cosmetic according to the received composition ratio.

Item 13 may provide a control method of the cosmetic manufacturing apparatus of items 1 and 2, the control method comprising: receiving skin condition measured by a measurement sensor; calculating a first composition ratio based on the received skin condition by a control unit 900; receiving the cosmetic purchase history of the user from an operating server 40, and calculating a second composition ratio by modifying the first composition ratio with a preset algorithm based on the purchase history; discharging cosmetic materials according to the second composition ratio by controlling a cosmetic material supply unit 200 by the control unit 900.

Item 14 may provide a control method of the cosmetic manufacturing apparatus of item 13, further comprising: after the discharging the cosmetic materials according to the second composition ratio by controlling the cosmetic material supply unit 200 by the control unit 900, manufacturing a cosmetic according to the second composition ratio by controlling a conveying means 800 by the control unit 900; when the manufactured cosmetic is manufactured in a sample manufacturing mode, receiving a fourth composition ratio obtained by modifying the composition ratio of the manufactured cosmetic; and manufacturing a cosmetic according to the fourth composition ratio by controlling the conveying unit 800 by the control unit 900.

Item 15 may provide a control method of the cosmetic manufacturing apparatus of items 1 to 14, the control method comprising: receiving skin condition measured by a measurement sensor; calculating a first composition ratio based on the received skin condition by a control unit; receiving the cosmetic purchase history of the user from an operating server 40, and calculating a second composition ratio by modifying the first composition ratio with a preset algorithm based on the purchase history; displaying at least one of the first composition ratio and the second composition ratio on a user interface unit 130; receiving one of the first composition ratio, the second composition ratio, and a third composition ratio which is one of the first composition ratio and the second composition ratio that modification has been applied to, and transmitting the received one to a control unit 900; discharging cosmetic materials according to the received one of the first composition ratio to the third composition ratio by controlling a cosmetic material supply unit 200 by the control unit 900.

Item 16 may provide a control method of the cosmetic manufacturing apparatus of items 1 to 15, wherein the receiving one of the first composition ratio, the second composition ratio, and a third composition ratio which is one of the first composition ratio and the second composition ratio that modification has been applied to, and transmitting the received one to a control unit 900 includes: displaying a selection reason on a user interface unit 130 so that a user inputs a reason for selecting one of the first composition ratio and the second composition ratio; receiving as an input the selection reason, calculating a third composition ratio according to a preset algorithm, and displaying the calculated third composition ratio on the user interface unit 130, by the control unit 900; and receiving as an input one of the first composition ratio, the second composition ratio, and the third composition ratio displayed on the user interface unit 130, and transmitting the received one of the first composition ratio, the second composition ratio, and the third composition ratio to the control unit 900.

Item 17 may provide a control method of the cosmetic manufacturing apparatus of items 1 to 16, further comprising: after the discharging the cosmetic materials according to the received one of the first composition ratio to the third composition ratio by controlling a cosmetic material supply unit 200 by the control unit 900, manufacturing a cosmetic according to the received composition ratio by controlling a conveying means 800 by the control unit 900; when the manufactured cosmetic is manufactured in a sample manufacturing mode, receiving a fourth composition ratio obtained by modifying the composition ratio of the manufactured cosmetic; and manufacturing a cosmetic according to the fourth composition ratio by controlling the conveying unit 800 by the control unit 900.

While until now the cosmetic manufacturing apparatus, the control method of a cosmetic manufacturing apparatus, and the cosmetic manufacturing system according to embodiments of this disclosure have been described as concrete embodiments, these are just exemplary embodiments, and this disclosure should be construed in a broadest scope based on the fundamental technical ideas disclosed herein, rather than being limited to them. By combining or replacing a part or parts of embodiments disclosed herein, the ordinary skilled in the art may carry out an embodiment which is not explicitly described herein, and however, it should be noted that it shall not depart from the scope of the disclosure. Besides, the ordinary skilled in the art may easily change or modify embodiments disclosed herein based on the disclosure, and however, it is obvious that such changes or modifications also fall within the scope of the disclosure.

REFERENCE SIGN LIST

1: cosmetic manufacturing system
10: cosmetic manufacturing apparatus
20: terminal
40: operating server
100: main body
140: cosmetic material storage unit
160: part supply unit
200: cosmetic material supply unit
300: seat portion
500: assembly portion
600: moisture absorption unit
800: conveying means
900: control unit

What is claimed is:

1. A cosmetic manufacturing apparatus comprising:
a control unit for calculating a first composition ratio based on the user's skin condition measured by a measurement sensor, receiving cosmetic purchase history of the user from an operating server, and calculating a second composition ratio by modifying the first composition ratio with a preset algorithm based on the purchase history; and
a cosmetic material supply unit which discharges cosmetic materials according to one of the first composition ratio and the second composition ratio, so that a cosmetic is manufactured according to the one of the first composition ratio and the second composition ratio,
wherein by the control unit, the first composition ratio is determined by inputting the skin measurement values measured by the measurement sensor as a variable into a preset calculation formula, or a composition ratio corresponding to the preset values in the product database which have the smallest difference between themselves and the skin measurement values measured by the measurement sensor is determined as the first composition ratio,
wherein the product database stores L1, a1, and b1 values, and composition ratios corresponding to these values,
wherein the skin measurement values are measured as arbitrary values L2, a2, b2 by the measurement sensor, and
wherein a composition ratio corresponding to the values stored in the product database having the smallest value of $\sqrt{(L1-L2)^2+(a1-a2)^2+(b1-b2)^2}$ is set as the first composition ratio.

2. The cosmetic manufacturing apparatus of claim 1, further comprising:
a user interface unit which displays at least one of the first composition ratio and the second composition ratio, and receives as an input one of the first composition ratio, the second composition ratio, and a third composition ratio which is one of the first composition ratio and the second composition ratio that modification has been applied to,
wherein the cosmetic material supply unit discharges cosmetic materials according to the received one of the input first composition ratio to the third composition ratio, so that a cosmetic is manufactured according to the received one composition ratio.

3. The cosmetic manufacturing apparatus of claim 2, wherein the user interface unit is provided with an input unit for selecting whether a cosmetic to be manufactured is of a sample manufacturing mode in which the cosmetic to be manufactured is provided as a sample, or of a finished product manufacturing mode in which the cosmetic to be manufactured is provided as a finished product.

4. The cosmetic manufacturing apparatus of claim 2, wherein the user interface unit is provided with an input unit for selecting whether a cosmetic to be manufactured is a foundation product or a skin care product.

5. The cosmetic manufacturing apparatus of claim 1, wherein
when the cosmetic purchase history which are represented as L3, a3, and b3 is received from the operating server, by the control unit,
the skin measurement values are modified to measurement modification values, $(P*L3+L2)/(P+1)$, $(P*a3+a2)/(P+1)$, and $(P*b3+b2)/(P+1)$, and
the second composition ratio is determined to be a composition ratio corresponding to the preset values preset in the product database having the smallest difference between themselves and the measurement modification values.

6. The cosmetic manufacturing apparatus of claim 5, wherein P is a natural number between 1 and 10 that is input by a user from the user interface unit or the terminal.

7. The cosmetic manufacturing apparatus of claim 1, wherein the first composition ratio is represented by a composition ratio X1:Y1:Z1:K1 for arbitrary cosmetic materials, and
when receiving a purchase history of a cosmetic having composition ratio X2:Y2:Z2:K2 for arbitrary cosmetic materials from the operating server,
by the control unit,
the second composition ratio is set to $(P*X1+X2)/(P+1)$:$(P*Y1+Y2)/(P+1)$:$(P*Z1+Z2)/(P+1)$:$(P*K1+K2)/(P+1)$.

8. The cosmetic manufacturing apparatus of claim 7, wherein P is a natural number between 1 and 10 that is input by a user from the user interface unit or the terminal.

* * * * *